(12) United States Patent
Bottasso

(10) Patent No.: US 11,014,660 B2
(45) Date of Patent: May 25, 2021

(54) ROTOR FOR A HOVER-CAPABLE AIRCRAFT AND RELATED METHOD OF CONTROL

(71) Applicant: LEONARDO S.P.A., Rome (IT)

(72) Inventor: Luigi Maria Bottasso, Samarate (IT)

(73) Assignee: LEONARDO S.P.A., Rome (IT)

( * ) Notice: Subject to any disclaimer, the term of this patent is extended or adjusted under 35 U.S.C. 154(b) by 153 days.

(21) Appl. No.: 16/328,069

(22) PCT Filed: Sep. 7, 2017

(86) PCT No.: PCT/EP2017/072496
§ 371 (c)(1),
(2) Date: Feb. 25, 2019

(87) PCT Pub. No.: WO2018/046612
PCT Pub. Date: Mar. 15, 2018

(65) Prior Publication Data
US 2019/0193850 A1    Jun. 27, 2019

(30) Foreign Application Priority Data
Sep. 7, 2016   (EP) .................................... 16187546

(51) Int. Cl.
*B64C 27/46* (2006.01)
*B64C 27/04* (2006.01)
*B64C 27/59* (2006.01)
*B64C 27/72* (2006.01)

(52) U.S. Cl.
CPC ............ *B64C 27/463* (2013.01); *B64C 27/04* (2013.01); *B64C 27/59* (2013.01); *B64C 27/72* (2013.01); *B64C 2027/7211* (2013.01)

(58) Field of Classification Search
CPC .............................. B64C 27/463; B64C 27/59; B64C 2027/7211
See application file for complete search history.

(56) References Cited

U.S. PATENT DOCUMENTS

| 6,467,732 B2 * | 10/2002 | Tsukahara ............. B64C 27/463 244/17.11 |
| 2006/0027703 A1 | 2/2006 | Bussom et al. |
| 2016/0075430 A1 * | 3/2016 | Foskey ................. B64C 27/473 416/1 |

FOREIGN PATENT DOCUMENTS

| EP | 1 127 786 | 8/2001 |
| EP | 2 228 299 | 9/2010 |
| KR | 2012 0059091 | 6/2012 |

\* cited by examiner

*Primary Examiner* — Juan G Flores
(74) *Attorney, Agent, or Firm* — Leason Ellis LLP

(57) ABSTRACT

A rotor for a hover-capable aircraft includes a hub rotatable about a first axis and at least two blades hinged to the hub. Each blade has a main portion hinged to the hub and a tip portion, which is arranged radially outermost with respect to first axis with respect to the corresponding main portion. The tip portion of each blade is movable with respect to the corresponding main portion of that blade. The tip portion of each blade is selectively movable with respect to the corresponding main portion of that blade between a first position, in which it defines a dihedral or anhedral angle with respect to the corresponding main portion; and a second position, in which it defines a positive or negative sweep angle with respect to the corresponding main portion.

23 Claims, 16 Drawing Sheets

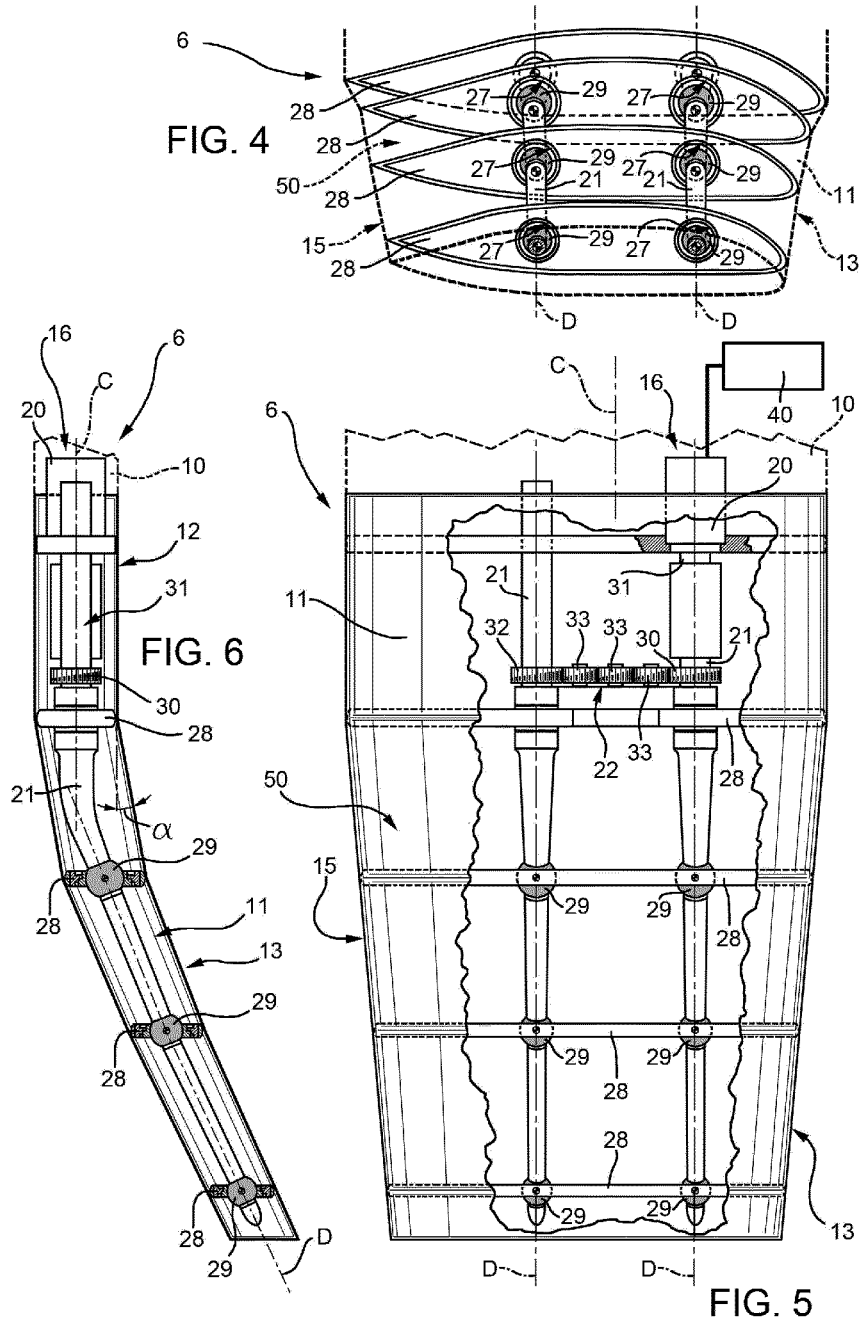

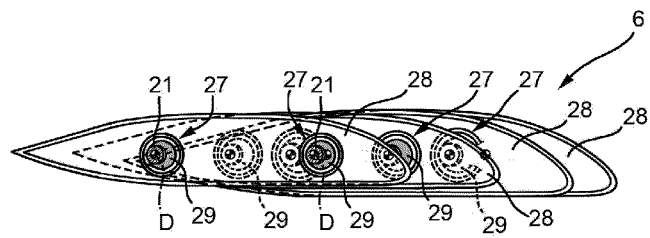
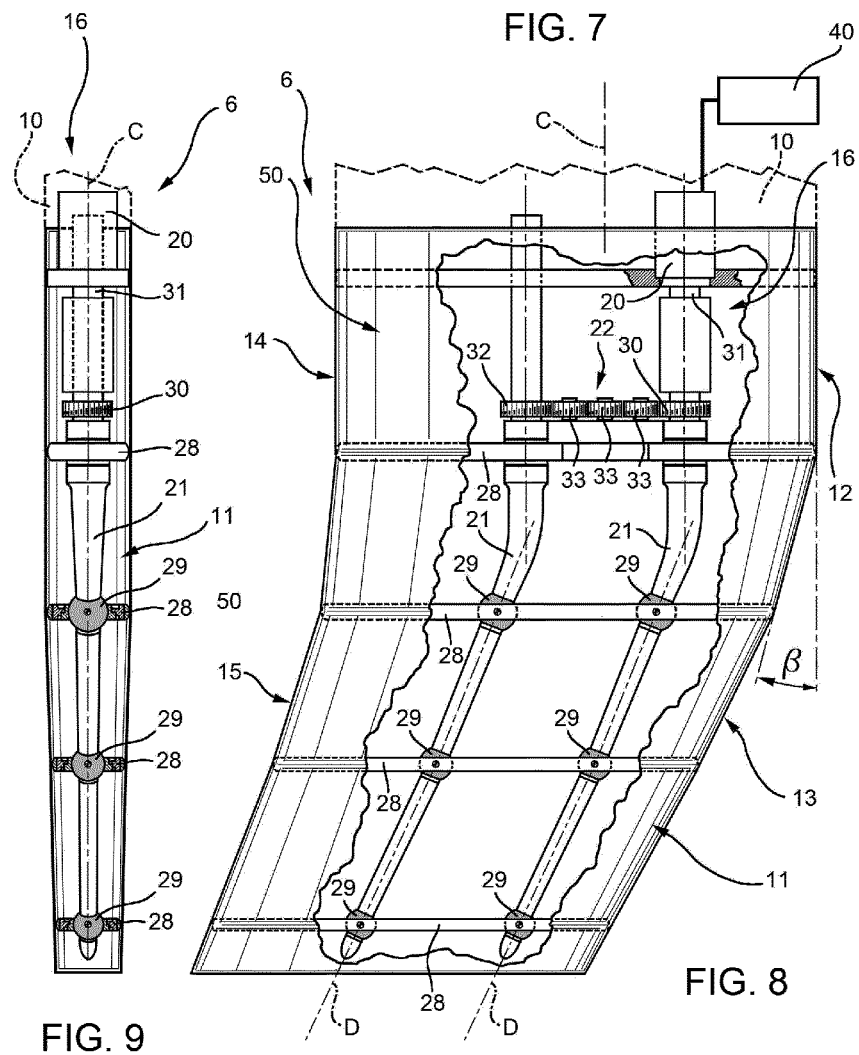

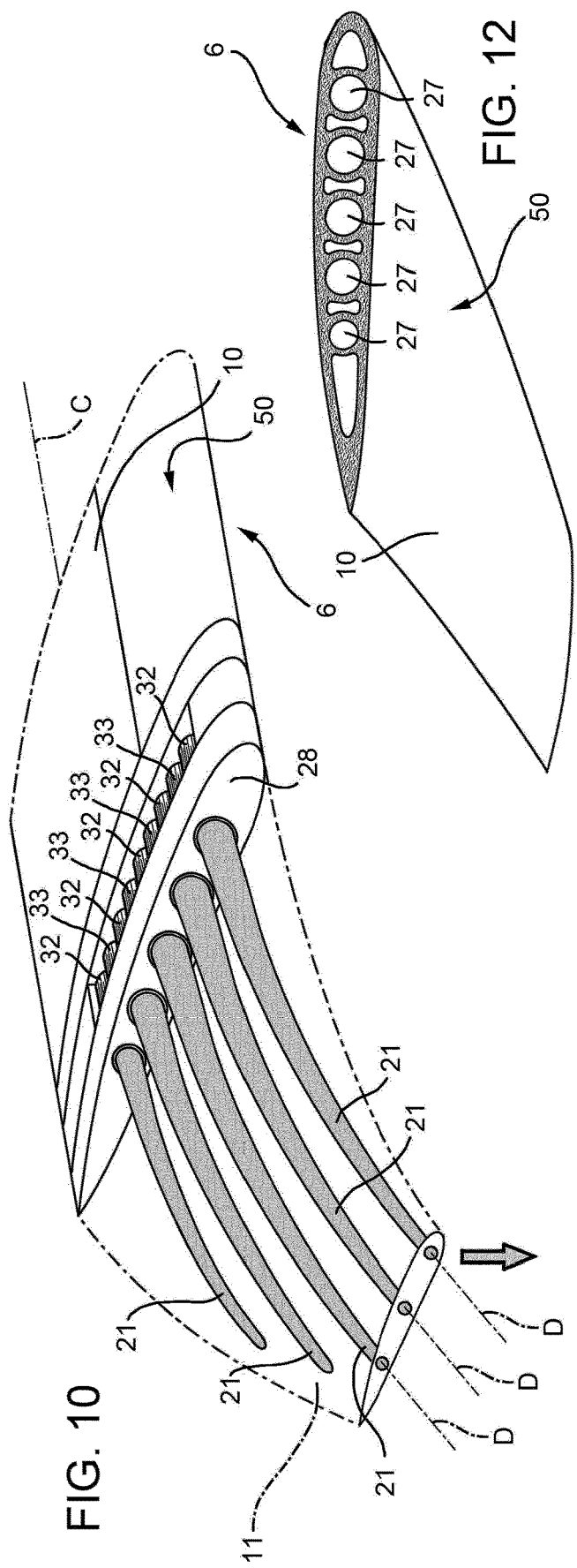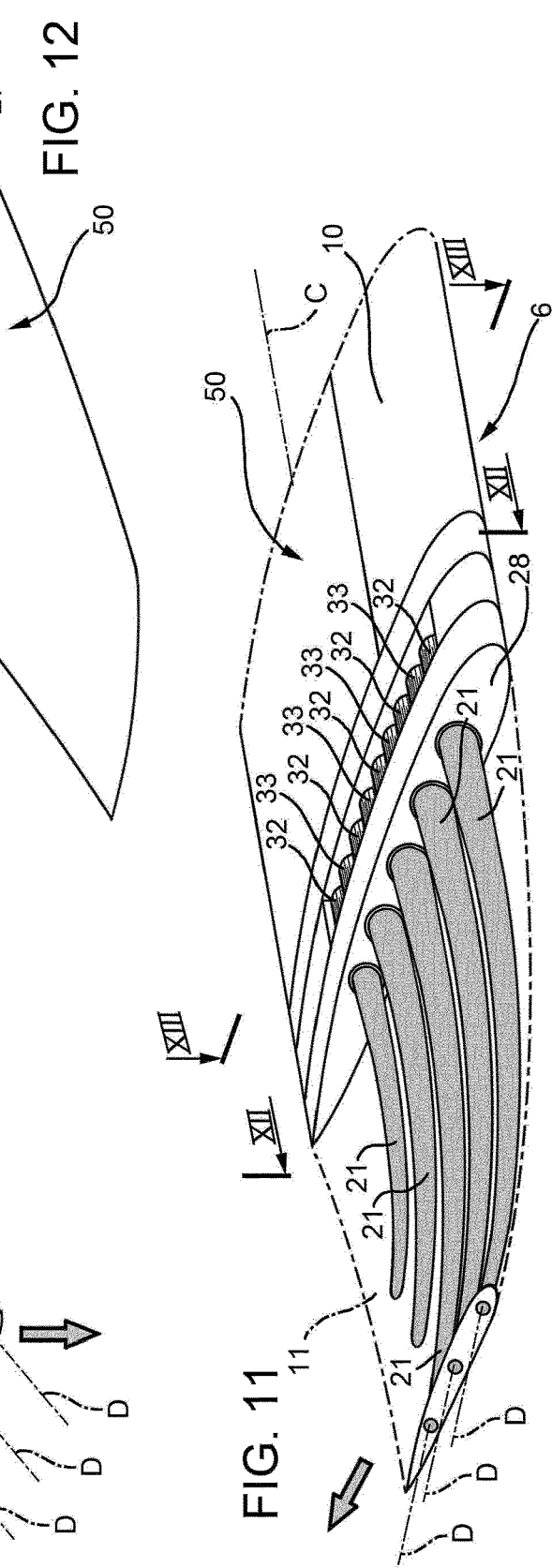

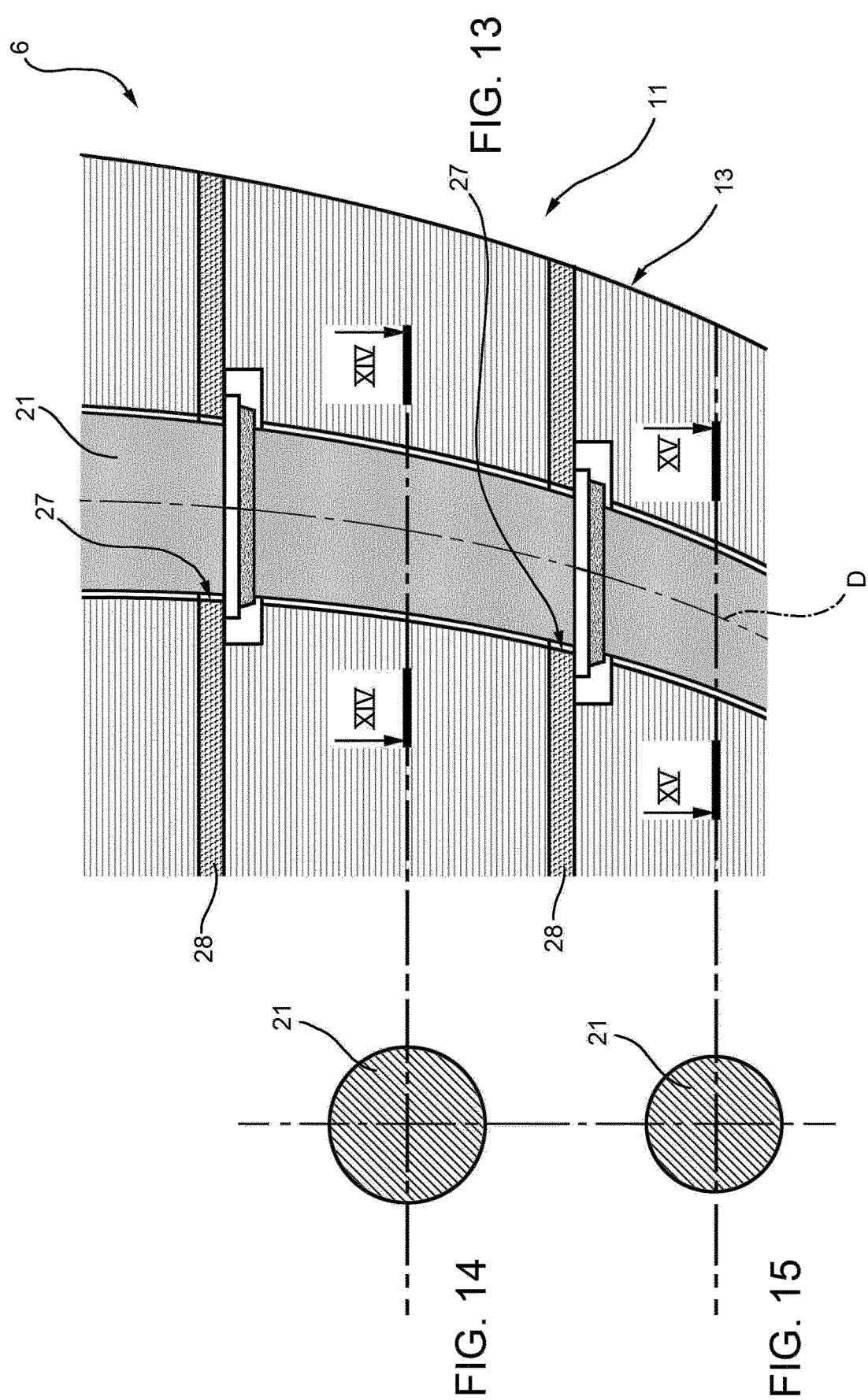

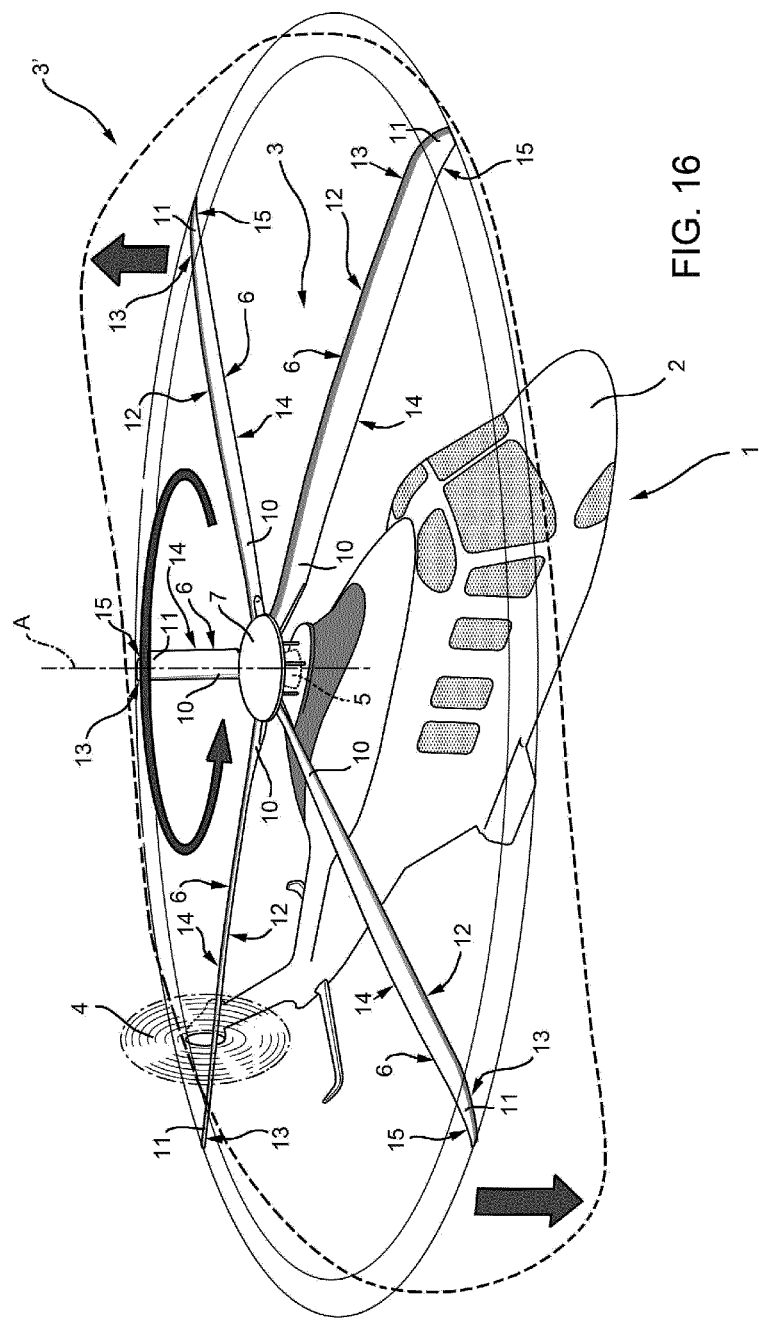

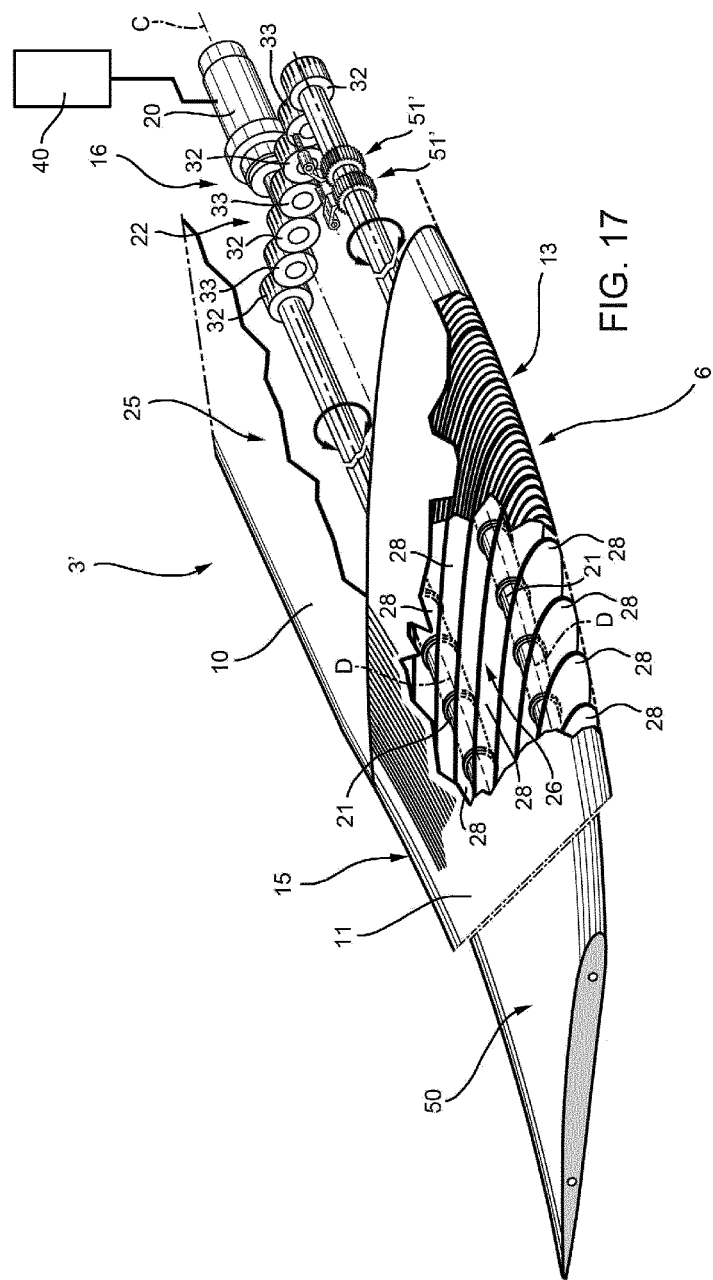

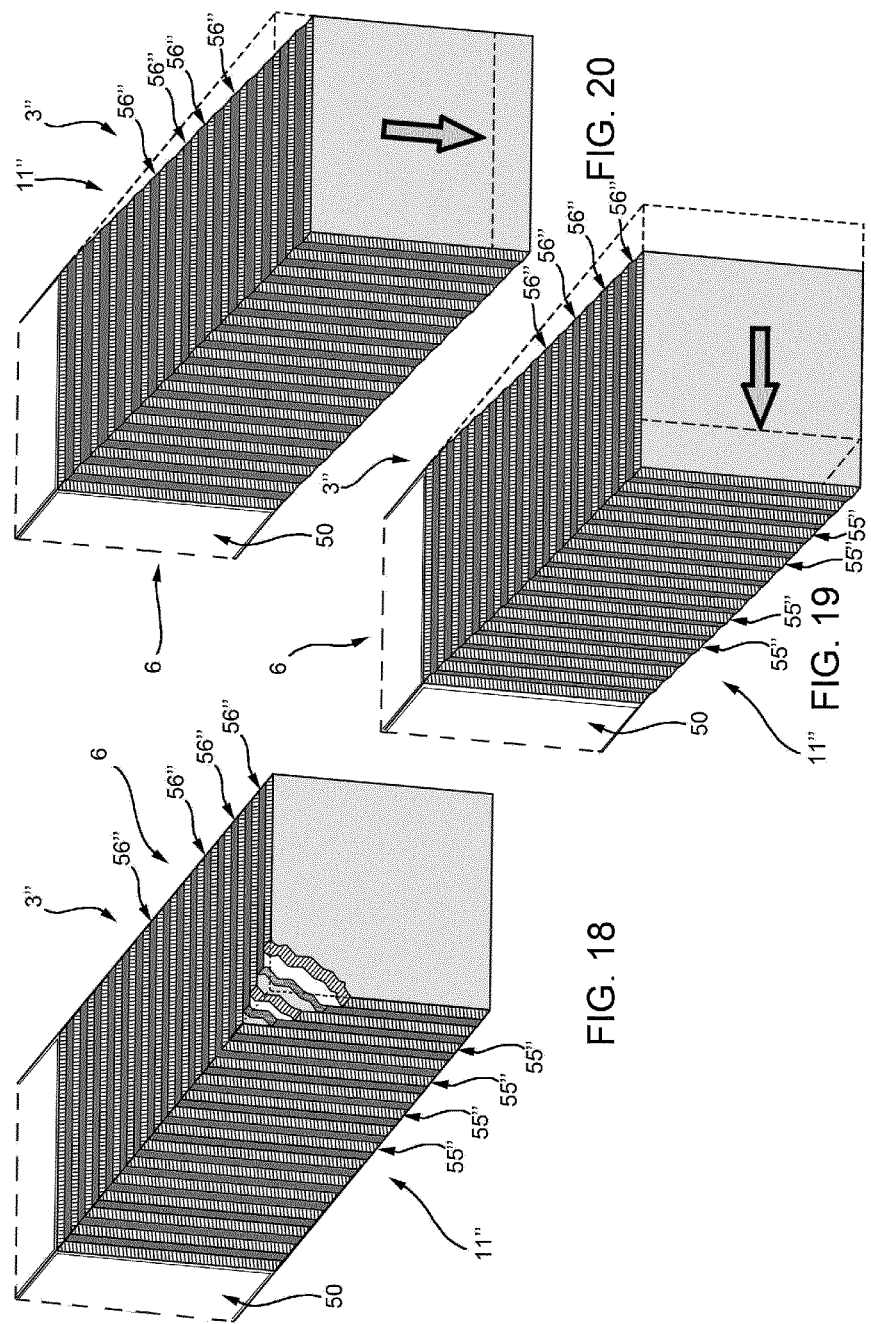

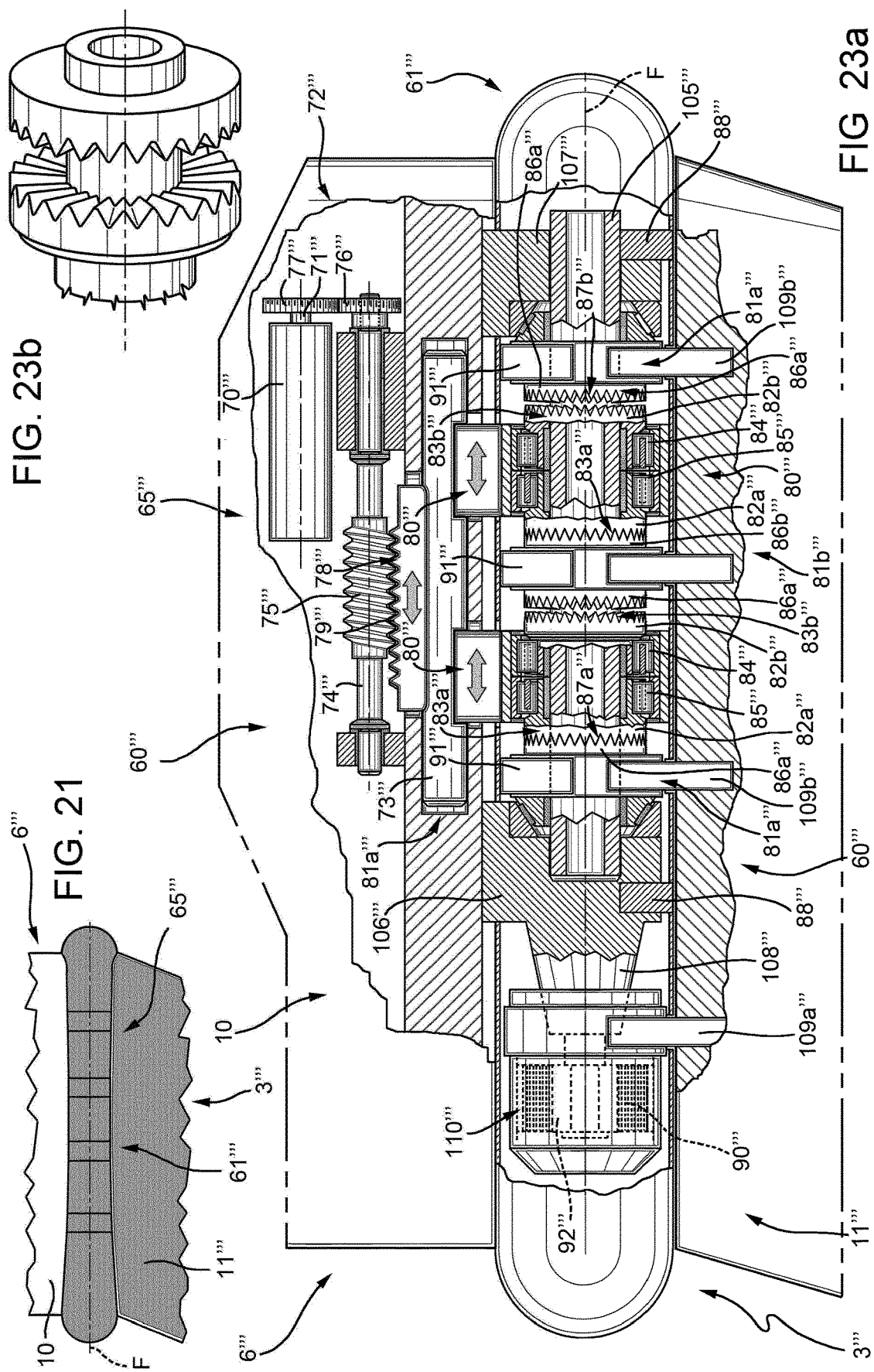

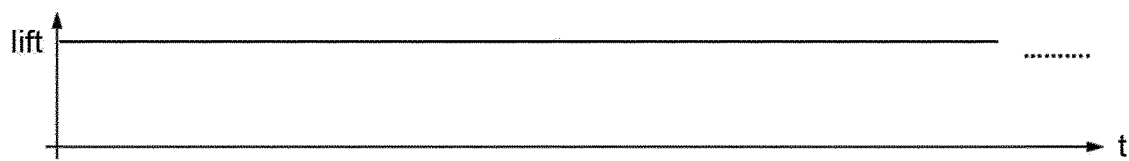
FIG. 27
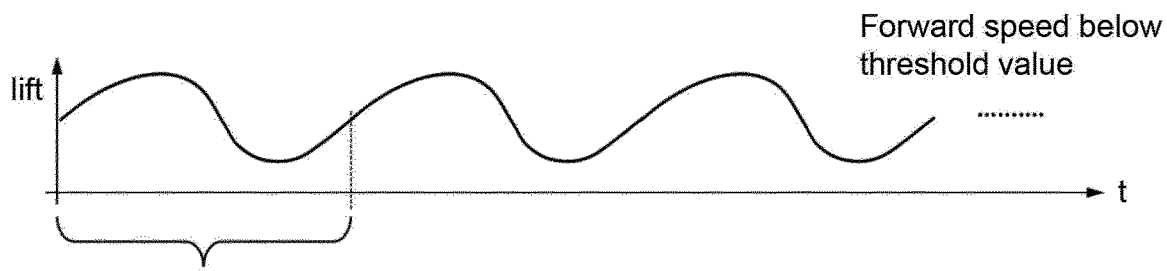
FIG. 28
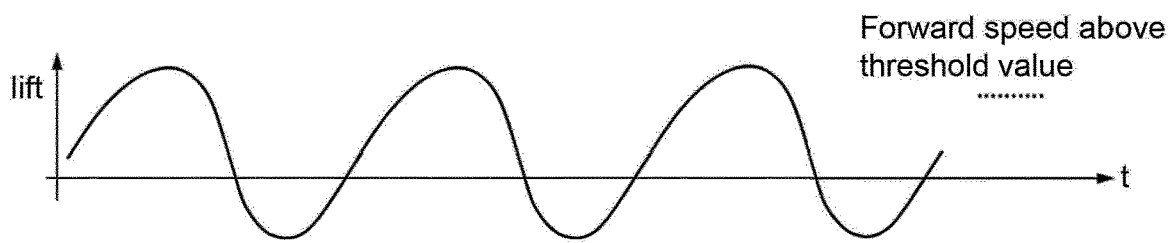
FIG. 29
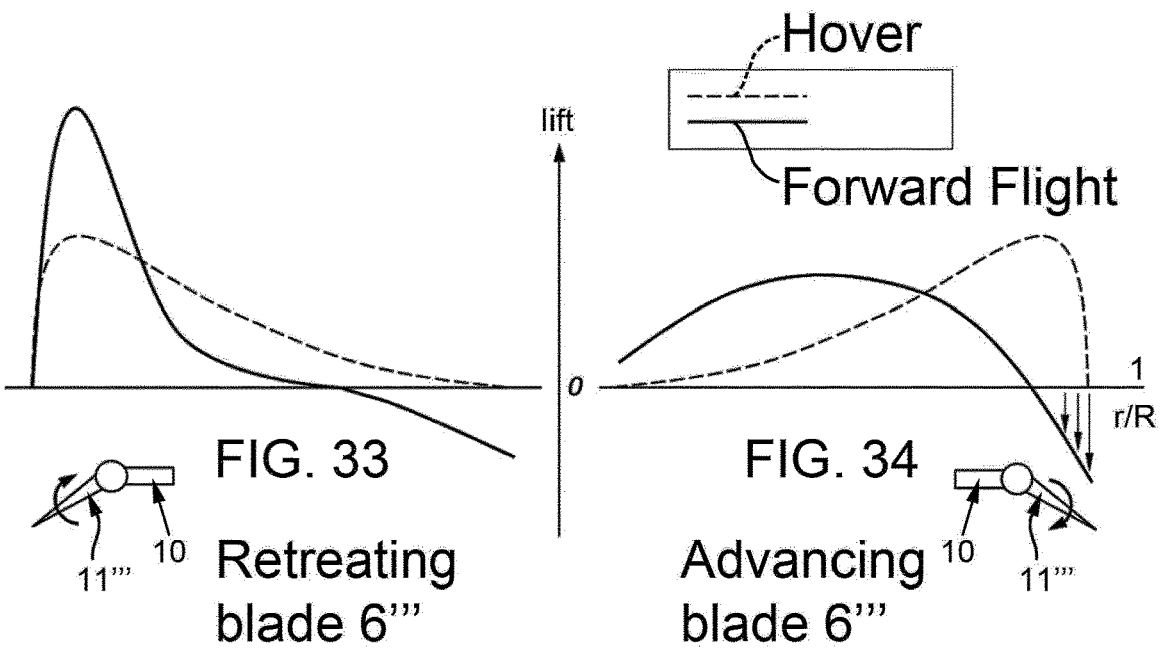
FIG. 33 Retreating blade 6'''
FIG. 34 Advancing blade 6'''

ROTOR FOR A HOVER-CAPABLE AIRCRAFT AND RELATED METHOD OF CONTROL

CROSS-REFERENCE TO RELATED PATENT APPLICATIONS

This application is a U.S. National Phase Application under 35 U.S.C. § 371 of International Patent Application No. PCT/EP2017/072,496, filed Sep. 7, 2017, which claims the priority of European Application No. 16187546.3, filed Sep. 7, 2016, which is incorporated by reference as if expressly set forth in its entirety herein.

TECHNICAL FIELD

The present invention relates to a rotor for a hover-capable aircraft.

The present invention also relates to a method of controlling a rotor for a hover-capable aircraft.

BACKGROUND ART

Known hover-capable aircrafts, such as helicopters for example, comprise a fuselage, a main rotor positioned on the top of a central portion of the fuselage and an anti-torque tail rotor with the function of countering the torque generated by the main rotor on the fuselage.

The main rotor basically comprises a mast rotatable about an axis, a hub coupled to this mast, and a plurality of blades fastened in a cantilever manner to the above-mentioned hub.

In particular, each blade has a substantially longitudinal extension radial to the axis of the mast and, in use, is driven in rotation by the hub on a motion plane transversal to the axis of the mast.

In addition, each blade is movable with respect to the hub on some or all of the orientation planes so as to enable the different manoeuvres of the helicopter.

Each blade comprises, in particular:
 a main portion defining a root of the blade, which is hinged to the hub; and
 a tip portion, which delimits the blade at the far end from the mast with respect to the main portion.

The main portion of each blade is longer than the corresponding tip portion.

In the helicopter industry, it is known to shape the tip portions of the blades with an anhedral (negative dihedral) angle with respect to the corresponding main portions. In other words, the tip portions of the blades are inclined downwards from the corresponding main portions and towards the fuselage of the helicopter.

Thanks to the presence of an anhedral angle, it is possible to improve the figure of merit in the helicopter's hovering conditions.

Despite enabling the behaviour of the helicopter to be improved in hovering conditions, the use of tip portions having anhedral angles makes the helicopter noisier in forward flight conditions.

In the industry, there is a need to make rotors for hover-capable aircraft that enable both preserving aerodynamic efficiency in hovering conditions and reducing noise in forward flight conditions.

More specifically, there is a need to make rotors of the above-identified type while containing as far as possible the displacement of the barycentre of the tip portions of the blades. This is in order to avoid having to counter high loads due to centrifugal acceleration, which can reach several hundreds of g on the tip portions.

In addition, there is a need to make rotors of the above-identified type that employ moderate actuating forces and/or without unbalancing the rotor in the event of erroneous control of one of the blades and/or without altering the aerodynamic profile of the blades, and therefore without penalizing the overall aerodynamic efficiency of the helicopter.

US2016/0075430 describes a rotor for a hover-capable aircraft in which each blade of the rotor comprises a tip portion hinged to a main root portion, and which can be operated to adjust the anhedral angle according to the flight conditions of the aircraft.

The rotor shown in US2016/0075430 further comprises a hydraulic actuator for adjusting the anhedral angle of the tip portion.

However, the use of power operated actuators for controlling the anhedral angle of the tip portion leaves room for improvement.

In particular, it is difficult to house an actuator within the small-sized region between the main blade portion and the tip portion.

Furthermore, the tip portions are subjected to very high aerodynamic and inertial loads, in particular centrifugal forces. Accordingly, the actuating system requires very powerful actuating forces and torques.

A need is therefore also felt within the industry to selectively adjust the angle between the tip portion and main portion, which requires as little as possible the use of power operated actuators.

DISCLOSURE OF INVENTION

The object of the present invention is to produce a rotor for an aircraft capable of hovering that satisfies at least one of the above-specified needs in a simple and inexpensive manner.

The aforesaid object is achieved by the present invention, in so far as it relates to a rotor for a hover-capable aircraft, as claimed in claim 1.

The present invention also relates to a method of controlling a rotor for a hover-capable aircraft, as claimed in claim 19.

The present invention also relates to a rotor for a hover-capable aircraft, as claimed in claim 24, 35 or 37.

The present invention also relates to a method of controlling a rotor for a hover-capable aircraft, as claimed in claim 32, 36 or 47.

BRIEF DESCRIPTION OF THE DRAWINGS

For a better understanding of the present invention, four preferred embodiments are described hereinafter, purely by way of non-limitative example and with reference to the accompanying drawings, in which:

FIG. 4 is a view taken from one side of the helicopter and on a still further enlarged scale of the blade in FIG. 3 in the first operating condition, with parts removed for clarity;

FIG. 5 is a view taken from above the helicopter of the blade in FIG. 4 in the first operating condition;

FIG. 6 is a view taken from the front of the helicopter of the blade in FIGS. 4 and 5 in the first operating condition;

FIG. 7 is a view taken from one side of the helicopter and on a still further enlarged scale of the blade in FIG. 3 in the second operating condition;

FIG. 8 is a view taken from above the helicopter of the blade in FIG. 7 in the first operating condition;

FIG. 9 is a view taken from the front of the helicopter of the blade in FIGS. 7 and 8 in the first operating condition;

FIG. 10 is a perspective view of the blade in FIGS. 4 to 9 in the first operating condition, with parts removed for clarity;

FIG. 11 is a perspective view of the blade in FIGS. 4 to 10 in the second operating condition, with parts removed for clarity;

FIG. 12 is a cross-section of the blade in FIGS. 4 to 11 along line XII-XII in FIG. 11;

FIG. 13 is a longitudinal section of the blade in FIGS. 4 to 12 along line XIII-XIII in FIG. 11;

FIGS. 14 and 15 are cross-sections of the blade in FIGS. 4 to 14 along lines XIV-XIV and XV-XV in FIG. 13, respectively;

FIG. 16 shows a helicopter comprising a rotor according to a second embodiment of the present invention;

FIG. 17 shows a perspective view, on a highly enlarged scale, of a blade of the rotor in FIG. 16, with parts removed for clarity; and FIGS. 18 to 20 schematically show the shape of the blade of a rotor according to a third embodiment of the invention, with parts removed for clarity;

FIG. 21 shows a blade of a rotor according to a fourth embodiment of the present invention in a first configuration;

FIGS. 22 and 23a are partially sectioned views of the blade of FIG. 21 in a first position and in a second position respectively, in enlarged view and parts removed for clarity;

FIG. 23b is an enlarged view of some components of FIG. 23a;

FIGS. 27 to 29 show the temporal variation of the lift acting on the tip portions of the blade of FIGS. 21 to 23a, when the helicopter is respectively in hover, in forward flight at a speed below a threshold value and at a speed above the threshold value;

FIGS. 33 and 34 show the lift distribution along the span of the blade of FIGS. 21 to 23a in a solid line with reference to a forward flight and in dotted line with reference to an hovering condition, respectively for a retreating blade and an advancing blade;

BEST MODE FOR CARRYING OUT THE INVENTION

Figure 1:
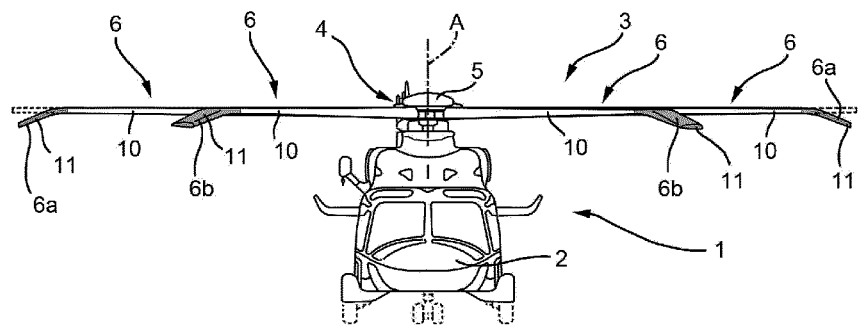
FIG. 1 is a front view of a helicopter comprising a rotor according to a first embodiment of the present invention equipped with blades arranged in a first operating condition of hovering and in a second operating condition of forward flight.
Figure 2:
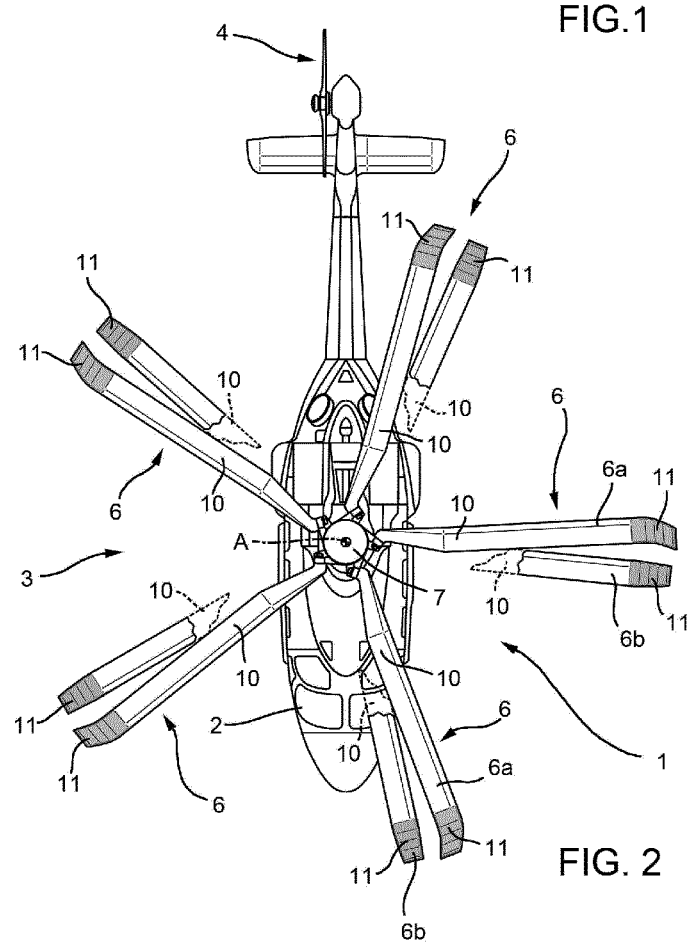
FIG. 2 is a top view of the helicopter in FIG. 1 showing the blades in the first and second operating conditions.
Figure 3:
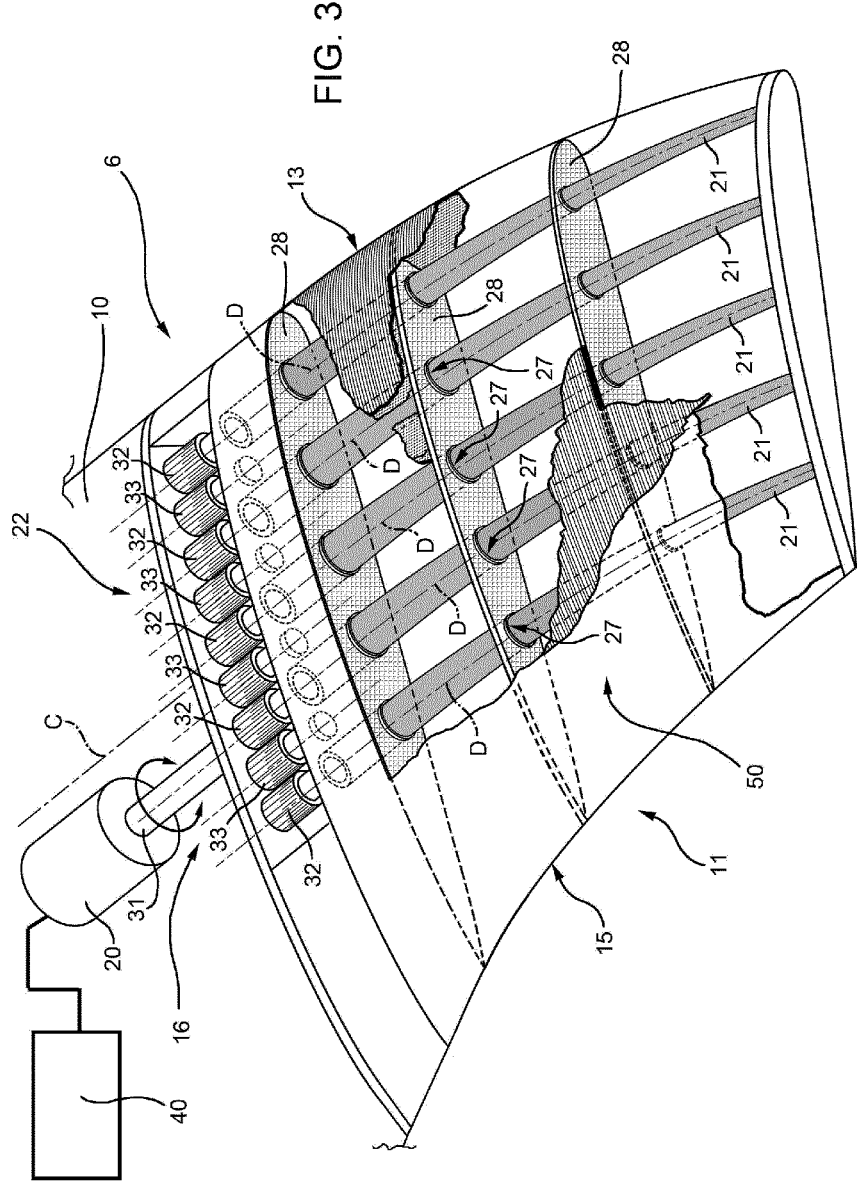
FIG. 3 is a perspective view on a highly enlarged scale of a blade of the rotor of the helicopter in FIGS. 1 and 2, with parts removed for clarity.

Referring to FIGS. 1 and 2, reference numeral 1 indicates a helicopter. The helicopter 1 basically comprises a fuselage 2, a main rotor 3 rotating about an axis and a tail rotor 4 located at one end of the fuselage 2 and rotating about its own axis transversal to axis A. In particular, the anti-torque tail rotor 4 projects in a cantilever manner from a fin situated at a tail end of the fuselage 2 and is designed to counter the torque transmitted by the rotor 3 to the fuselage 2.

In greater detail, the rotor 3 basically comprises:
- a mast 5 rotating about an axis A transversal to the axis of rotation of the main rotor;
- a plurality of blades 6, five in the case shown, extending along respective directions substantially radial to axis A; and
- a hub 7 operatively connected to the mast 5 and from which the blades 6 extend in a cantilever manner.

In greater detail, the hub 7 drives the blades 6 in rotation about axis A and enables the blades 6 to rotate, under the action of an external drive, about respective directions of extension to vary the respective angles of attack with respect to the airflow.

The blades 6 are hinged to the hub 7 so as to be movable about different axes, according to the configuration of the rotor 3.

In the following description, reference will be made to only one blade 6, as the blades 6 are all identical.

The blade 6 comprises:
- a main portion 10 defining a root of the blade 6 hinged to the hub 7 and extending along an axis C (FIGS. 3 to 8) transversal to axis A; and
- a tip portion 11 arranged at the far end of the main portion 10 with respect to the tip portion 11.

The main portion 10 is longer than the tip portion 11 in the direction of radial extension of the blade 6.

The tip portion 11 is movable with respect to the main portion 10.

Advantageously, the tip portion 11 is selectively movable with respect to the main portion 10 between:
- a first position (assumed by the blades indicated with a continuous line in FIG. 1 and by reference numeral 6b in FIG. 2), in which it defines a dihedral or anhedral angle α with respect to the main portion 10; and
- a second position (assumed by the blades indicated by with a dotted line in FIG. 1 and by reference numeral 6a in FIG. 2), in which it defines a positive or negative sweep angle β with respect to the main portion 10.

The main portion 10 and tip portion 11 have respective leading 12 and 13 and trailing edges 14 and 15.

The term dihedral/anhedral angle α indicates the angle formed between the leading edge 13 of the tip portion 11 and the leading edge 12 of the main portion 10 on a plane parallel to axis A and to axis C, at the common point of the leading edges 12 and 13.

An anhedral angle α indicates that the leading edge 13 of the tip portion 11 is inclined towards the fuselage 2 with respect to the leading edge 12 of the main portion 10.

Whereas a dihedral angle α indicates that the leading edge 13 of the tip portion 11 is inclined away from fuselage 2 with respect to the leading edge 12 of the main portion 10.

The term sweep angle β indicates the angle formed between the leading edge 13 of the tip portion 11 and the leading edge 12 of the main portion 10 in a plane transversal to axis A, at the common point of the leading edges 12 and 13.

A positive sweep angle β indicates that the leading edge 13 of the tip portion 11 is arranged downstream with respect to the leading edge 12 of the main portion 10, with reference to the direction of motion of the blade 6 about axis A.

Whereas a negative sweep angle β indicates that the leading edge 13 of the tip portion 11 is arranged upstream with respect to the leading edge 12 of the main portion 10, with reference to the direction of motion of the blade 6 about axis A.

More specifically, the sweep angle β of the tip portion 11 with respect to the main portion 10 is minimized when the tip portion 11 is arranged in the first position.

The dihedral angle α of the tip portion 11 with respect to the main portion 10 is zero, when the tip portion 11 is arranged in the second position.

The blade 6 also comprises an actuator unit 16 to produce the transition of the tip portion 11 between the first and second positions.

In greater detail, actuator unit 16 comprises (FIGS. 3 to 9):
 a motor 20;
 a plurality of rods 21 operatively connected to consecutive sections of the tip portion 11 and destined to induce the transition of the tip portion 11 between the first and second positions; and
 a transmission unit 22 functionally interposed between the motor 20 and the rods 21.

In the case shown, the motor 20 is a stepper motor.

Furthermore, the motor 20 is housed inside the main portion 10.

The rods 21 rotate about respective axes parallel to each other and to axis C, and in turn comprise:
 sections 25 housed in the main portion 10 and extending parallel to the associated axis C; and
 sections 26 housed in the tip portion 11 and extending along respective axes D with respect to axis C.

In particular, sections 26 are inclined with respect to sections 25.

In the case shown, sections 25 and the associated axes C are straight, while sections 26 and the associated axes D are curved.

In the case shown, sections 26 are shaped in such a way that:
 the axes D extend, with respect to axis C, towards the fuselage 2 when the blade 6 is arranged in the first position (FIGS. 4 to 6);
 the axes extend, with respect to axis C, in the opposite direction to that of the motion of the blade 6 when the latter is arranged in the second position (FIGS. 7 to 9).

Sections 26 are housed in a rotatable manner inside respective apertures 27 defined by ribs 28 of the tip portion 11.

In this way, the rods 21 are rotatable with respect to the ribs 28.

Preferably, the rods 21 are connected to the respective ribs 28 by corresponding articulated joints 29 (FIGS. 4-9).

Furthermore, the rods 21 are axially constrained to the ribs 28 parallel to axis C in a manner not shown in detail in the accompanying figures.

Thanks to the mode of constraint between the rods 21 and the ribs 28, the latter move in a plane orthogonal to axis C and their section in this plane does not change during the transition of the tip portion 11 between the corresponding first and second positions, so as not to alter the sections transversal to axis D of the tip portion 11. Whereas the sections of the tip portion 11 interposed between the ribs 28 elastically shear deform in a plane orthogonal to the tip portion 11.

The ribs 28 are spaced apart along the direction of extension of the tip portion 11.

More specifically, the section area of the rods 21 transversal to associated axis D decreases when proceeding along the tip portion 11 away from axis A.

The rods 21 also perform the function of supporting the bending moments and shear loads on the associated blades 6. In other words, the rods 21 perform the structural function normally carried out by the spars used in the blades.

In the case shown in FIG. 13, the rods 21 have a circular section in a plane orthogonal to axes C and D. The diameter of the rods 21 decreases when proceeding along the tip portion 11 following axes D.

In the case shown, there are five rods 21 (only some of which are shown in FIGS. 3 to 9).

The transmission unit 22 comprises, in particular, (FIGS. 3 to 9):
 a cogwheel 30 connected to an output shaft 31 of the motor 20;
 a plurality of cogwheels 32 connected to respective rods 21; and
 a plurality of cogwheels 33 interposed between cogwheel 30 and cogwheels 32.

The helicopter 1 also comprises a control unit 40 (only shown schematically in FIG. 3) configured to:
 arrange the blades 6 in the respective first positions, when the helicopter 1 is in the hovering condition; and
 arrange the blades 6 in the respective second positions, when the helicopter 1 is in the forward flight condition.

The tip portion 11 comprises a covering 50 defining the aerodynamic surface.

The operation of the rotor 3 will now be described in detail below.

In particular, the operation of the rotor 3 is described with reference to a single blade 6, the operation of all the blades 6 being identical.

In the case where it is necessary to maintain the helicopter 1 in hovering conditions, the control unit 40 controls the motor 20 so as to arrange the tip portion 11 in the first position (FIGS. 4 to 6), where angle α is anhedral and the sweep angle β is minimized.

In the case where it is required to fly forwards with the helicopter 1, the control unit 40 controls the motor 20 so as to arrange the tip portion 11 in the second position (FIGS. 7 to 9), where the dihedral angle α is zero and the sweep angle β is positive.

The operation of the rotor 3 during the transition of the blade 6 from the first position to the second position will now be described.

The motor 20, via the transmission unit 22, causes the rotation of the rods 21 about axis C, by an angle of ninety degrees in the case shown.

This causes a ninety-degree rotation with a circumferential arc trajectory of sections 26 of the rods 21 about axis C.

Since sections 26 of the rods 21 are inclined with respect to the associated sections 25 and can rotate inside the apertures 27 of the ribs 28, the tip portion 11 deforms.

In particular, the ribs 28 of the tip portion 11 move rigidly, maintaining their shape in planes orthogonal to the axes D as they are in contact with the rods 21, while the sections of the tip portion 11 interposed between the ribs 28 elastically shear deform.

Referring to FIGS. 16 and 17, reference numeral 3' indicates, as a whole, a rotor according to a second embodiment of the present invention.

Rotor 3' differs from rotor 3 in that it comprises a pair of freewheels 51' interposed along one of the actuating rods 21' and configured to prevent rotation of the rods 21' about axis C in the clockwise and anticlockwise directions, respectively. In particular, it is possible to selectively activate one of the freewheels 51' and deactivate the other freewheel 51'.

The operation of rotor 3' differs from rotor 3 in that it uses, at least in forward flight at speeds above a threshold value, the aerodynamic force acting on the tip portions 11 to move them between the first and second operating positions.

In fact, at speeds above the threshold value, the lift acting on the tip portions 11 varies in sign depending on whether the associated blades 6 are advancing or retroceding.

Referring to FIG. 16, lift is directed downwards when the blades 6 are advancing—i.e. they have respective tangential velocities concordant with the direction of flight of the helicopter 1—and upwards when the blades 6 are retroceding—i.e. they have respective tangential velocities discordant with respect to the direction of flight of the helicopter 1.

Rotor 3' uses, jointly with the motor 20, the downward (upward) lift forces to arrange the tip portions 11 in the first position with an anhedral (dihedral) angle α, before setting the helicopter 1 in hovering conditions.

In particular, when it is necessary to arrange the tip portion with a dihedral (anhedral) angle α, the freewheel 51' that allows rotation in the clockwise (anticlockwise) direction of the rods 21' is activated and the other freewheel 51' is deactivated (and vice versa).

The covering 50 also comprises (FIG. 17) fibres arranged along the associated axes D so that it becomes axially rigid and shear-flexible.

Referring to FIGS. 18 to 20, reference numeral 3" indicates, as a whole, a rotor according to a third embodiment of the present invention.

Rotor 3" differs from rotor 3 in that the tip portion 11" of each blade 6 (shown entirely schematically) is formed by a plurality of elements 55" in a rigid material and elements in a viscoelastic material 56" lying on respective planes orthogonal to axis C and alternating with one another along axis C.

In this way, the tip portions 11 are particularly rigid to flexure in planes orthogonal to axis C so as to maintain the shape of the ribs 28 and therefore the aerodynamic efficiency of the covering 50, and shear deformable in planes perpendicular to axis C under the action of the rods 21.

The operation of rotor 3" is identical to that of rotor 3 and is therefore not described in detail.

Referring to FIGS. 21 to 35, reference numeral 3''' indicates, as a whole, a rotor according to a fourth embodiment of the present invention.

Rotor 3''' differs from rotor 3 in that it does not comprise actuating unit 16 and in that the adjustment of the position of tip portions 11''' relative to main portion 10 is achieved by means of the resultant moments Mr generated by inertia forces and aerodynamic forces and/or elastic forces and/or damping forces on respective tip portions 11'''.

Furthermore, differently from blade 6 of rotor 3, 3', 3", the sweep angle of tip portion 11''' remains constant as blade 6''' moves between the first and the second position.

In particular, tip portion 11''' of each blade 6''' is movable with respect to relative main portion 10 between:
  a relative first angular position, in which it defines anhedral angle α with respect to relative main portion 10; and
  a relative second angular position, in which it defines a null angle or a minimized anhedral angle α with respect to relative main portion 10.

In the embodiment shown, when set in the first angular position, tip portion 11''' is arranged at a lower level than in the second angular position.

Blade 6''' comprises connecting means 60''' for connecting tip portion 11''' to main portion 10 movably between the first and second position.

In greater detail, connecting means 60''' comprises a hinge 61''' extending about an axis F tangential to axis A and about which tip portion 11''' is hinged to main portion 10.

Still more precisely, hinge 61''' comprises (FIG. 22):
  a tubular element 105''' coaxial to axis F;
  a number of protrusion 106''', 107''', protruding from main portion 10 and axially spaced along axis F, and angularly and axially connected to tubular element 105'''; and
  a plurality of joining elements 109b''', three in the embodiment shown, articulated onto tubular element 105''' about axis F and protruding from tip portion 11'''.

Protrusion 106''' comprises a conical end 108''' coaxial to axis C and fitted inside a body 110''' onto which a further joining element 109a''' is articulated about axis F. Further joining element 109a''' also protrudes from tip portion 11'''.

Advantageously, connecting means 60''' can be selectively set in a first configuration (FIG. 22) in which they:
  allow the rotation of tip portion 11''' with respect to main portion 10 in a first angular direction and up to the first angular position; and
  prevent the rotation of tip portion 11''' with respect to main portion 10 in a second angular direction opposite to the first angular direction.

Furthermore, connecting means 60''' can be selectively set in a second configuration (FIG. 23*a*), in which they:
  allow the rotation of tip portion 11''' with respect to main portion 10 in the second angular direction and up to the second angular position; and
  prevent the rotation of tip portion 11''' with respect to main portion 10 in the first angular direction.

In the embodiment shown, the first angular direction corresponds to a downwards movement of tip portions 11''' about relative axes C, i.e. to an increase of the anhedral angle α or to a decrease of dihedral angle.

The second angular direction corresponds to an upwards movement of tip portions 11''', i.e. to a decrease of anhedral angle α or to an increase of dihedral angle.

Preferably, each tip portion 11''' is set in the respective first angular position, when helicopter 1 is in hover and is set in the respective second angular position, when helicopter 1 is in forward flight.

Furthermore, each tip portion 11''' is movable from the first angular position to the second angular position, when helicopter 1 is in hover or in forward flight with a speed lower than a threshold value and helicopter 1 must be arranged in a configuration optimized for forward flight. Accordingly, connecting means 60''' are set in the first configuration, when helicopter 1 is in hover or in forward flight with a speed lower than a threshold value, and are moved to the second configuration when helicopter 1 must be arranged in a configuration optimized for forward flight.

Each tip portion 11''' is also movable from the second angular position to the first angular position when helicopter 1 is in forward flight and helicopter 1 must be arranged in a configuration optimized for hovering. Accordingly, connecting means 60''' are set in the second configuration, when helicopter 1 is in forward flight with a speed greater than a threshold value, and are moved to the first configuration, when helicopter 1 must be arranged in a configuration optimized for hovering.

In the following of the present description, reference will be made to only one blade 6''', being all blades 6''' identical one another.

Preferably, blade 6''' comprises (FIGS. 22, 23a and 35) a rotational spring 90''', which is interposed between relative main portion 10 and tip portion 11''' and exerts an elastic torque Mk about relative axis F on tip portion 11'''.

In the embodiment shown, spring 90''' elastically pre-loads tip portion 11''' towards the first angular position.

Preferably, blade 6''' comprises (FIGS. 22, 23a and 35) a rotational damper 92''', which is interposed between main portion 10 and tip portion 11''', and exerts a damping torque Md dependent on the rate of rotation about axis F on tip portion 11'''.

In the embodiment shown, spring 90''' and/or damper 92''' are housed inside body 110'''.

Figure 35:
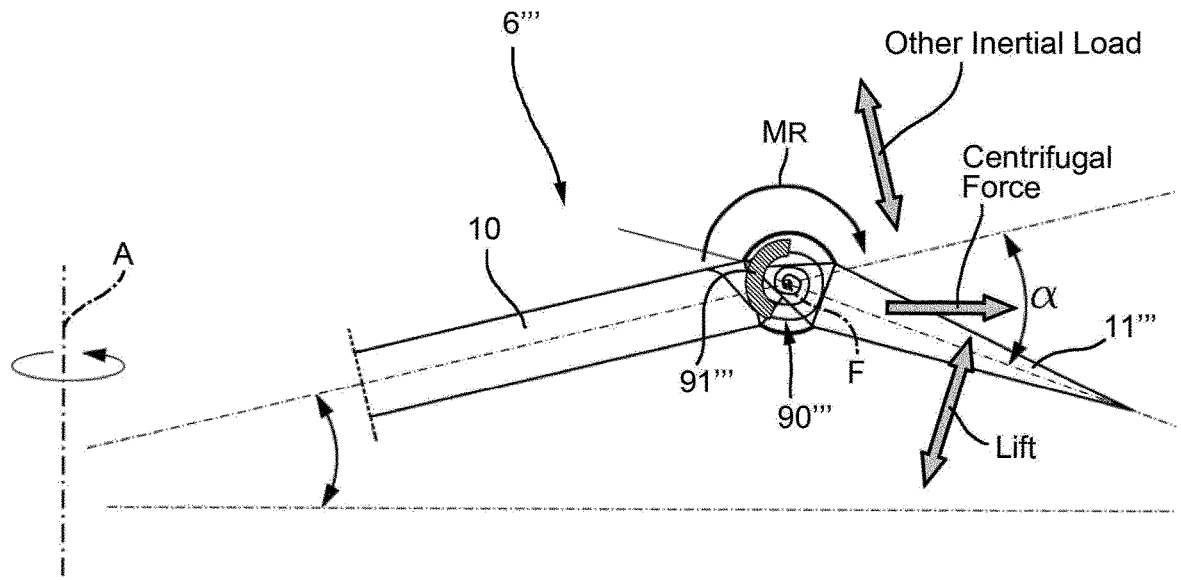
FIG. 35 shows the forces acting on the tip portion of the blade of FIGS. 21 to 23a together with further components of this blade.

Preferably, blade 6''' comprises a plurality of ballasts 91''' arranged on tip portion 11''' and aimed to locate the centre of mass of tip portion 11''' as close as possible to axis F, so as to minimize the moment Mc due to centrifugal force and other inertial actions acting on tip portion 11''' (FIG. 35).

Ballasts 91''' are fixed to main portion 10. In particular, ballasts 91''' are radially opposed radially to axis F with respect to respective joining elements 109a''', 109b'''. In the embodiment shown, ballasts 91''' are made in tungsten.

With reference to FIGS. 27 to 29, it is shown the temporal variation of the lift acting on tip portion 11''' for three different flight condition of helicopter 1.

In the following of the present description, the expression "positive lift" will indicate an upwardly directed lift while the expression "negative lift" will indicate a downward directed lift.

In particular, FIG. 27 shows the temporal variation of lift resulting on tip portion 11''' of blade 6''' in a hover condition of helicopter 1. In this hover condition, the lift is positive and substantially constant in value. Accordingly, the aerodynamic moment Mlift generated on tip portion 11''' by the lift is constant directed in the second angular direction, counter-clockwise in FIG. 35.

FIG. 28 shows the temporal variation of lift resulting on tip portion 11''' of blade 6''' in a forward flight of helicopter 1 with a speed below a threshold value. In this condition, the lift is positive but cyclically changes in value. Accordingly, the aerodynamic moment Mlift generated by the lift on tip portion 11''' is variable and directed in the second angular direction, counter-clockwise in FIG. 35.

FIG. 29 is relative to a forward flight condition of helicopter 1 with a speed above a threshold value. In this condition, the lift acting on tip portion 11''' is cyclically positive and negative (upwards and downwards directed) and changes in value. In particular (see FIGS. 33 and 34):

when blade 6''' is advancing (FIG. 34), i.e. is moving towards the front of helicopter 1, tip portion 11''' undergoes a negative lift; and when blade 6''' is retreating (FIG. 33), i.e. is moving towards the rear of helicopter 1, tip portion 11''' undergoes a positive lift.

Accordingly, aerodynamic moment Mlift acting on tip portion 11''' of blade 6''' is directed in the first angular direction, clockwise in FIG. 35, when blade 6 is advancing; and is directed in the second angular direction, counter-clockwise in FIG. 35, when blade 6''' is retreating.

Moments Mlift, Mk, Md, Mc generate a resulting moment Mr about axis on tip portions 11'''. Preferably, spring 90''', ballasts 91''' and damper 92'' are configured to direct resulting moment Mr:

in the second angular direction, when helicopter 1 in in hover or in forward flight with a speed lower than the threshold value; and cyclically in the first and second angular directions (respectively if the blade is advancing or retreating), when helicopter 1 is in forward flight with a speed greater than the threshold value.

Depending on the orientation of resulting moment Mr and on the configuration of connecting means 60''', tip portion 11''' is rotated in the first or in the second angular direction or remains angularly fixed with respect to main portion 10.

In particular, in case resulting moment Mr is directed in the first angular direction and connecting means 60''' are set in the first configuration, tip portion 11''' is rotated up to the first angular position.

In case resulting moment Mr is directed in the first angular direction and connecting means 60''' are set in the second configuration, tip portion 11''' is not rotated.

In case resulting moment Mr is directed in the second angular direction and connecting means 60''' are set in the second configuration, tip portion 11''' is rotated up to the second angular position.

In case resulting moment Mr is directed in the second angular direction and connecting means 60''' are set in the first configuration, tip portion 11''' is not rotated.

Furthermore, blade 6''' comprises a partially relieved stop element 88''', which defines a first and a second stop for tip portion 11''' set in the first angular position and the second angular position respectively.

Preferably, stop element 88''' stops tip portion 11''' in the first position at anhedral angle α of about 20 degrees with respect to the plane of main portion 10 and in the second position at a null anhedral angle α with respect to the plane of main portion 10.

In greater detail, blade 6''' comprises an actuator 65''' controllable by a control unit 66''' of rotor 3''' and which can be operated to set connecting means 60''' in either the first configuration or the second configuration.

In greater detail, actuator 65''' is housed inside main portion 10.

Actuator 65'''' comprises (FIGS. 22 and 23a):

an electric motor 70''' controlled by control unit 66''' and having an output shaft 71''' rotating parallel to axis F;

an output member 73''' slidable parallel to axis F; and a transmission group 72''' interposed between electric motor 70''' and output member 73'''.

In particular, transmission group 72''' comprises:

a shaft 74''' rotatable parallel to axis F, provided with a worm-screw 75''' and having a gear 76''' at an end thereof;

a gear 77''' meshing with gear 76''' and arranged at an axial end of output shaft 71'''; and a slide 78''', which is free to slide parallel to axis F, comprises a rack 79''' meshing with worm-screw 75''' and is integrally movable together with output member 73'''.

Output member 73''' is housed in a compartment of main portion 10.

Connecting means 60''' comprise, in turn:

a plurality of coupling elements 80''' carried by main portion 10 and connected to output member 73'''; and a plurality of coupling elements 81a''', 81b''' carried by tip portion 11'''.

Figure 22:
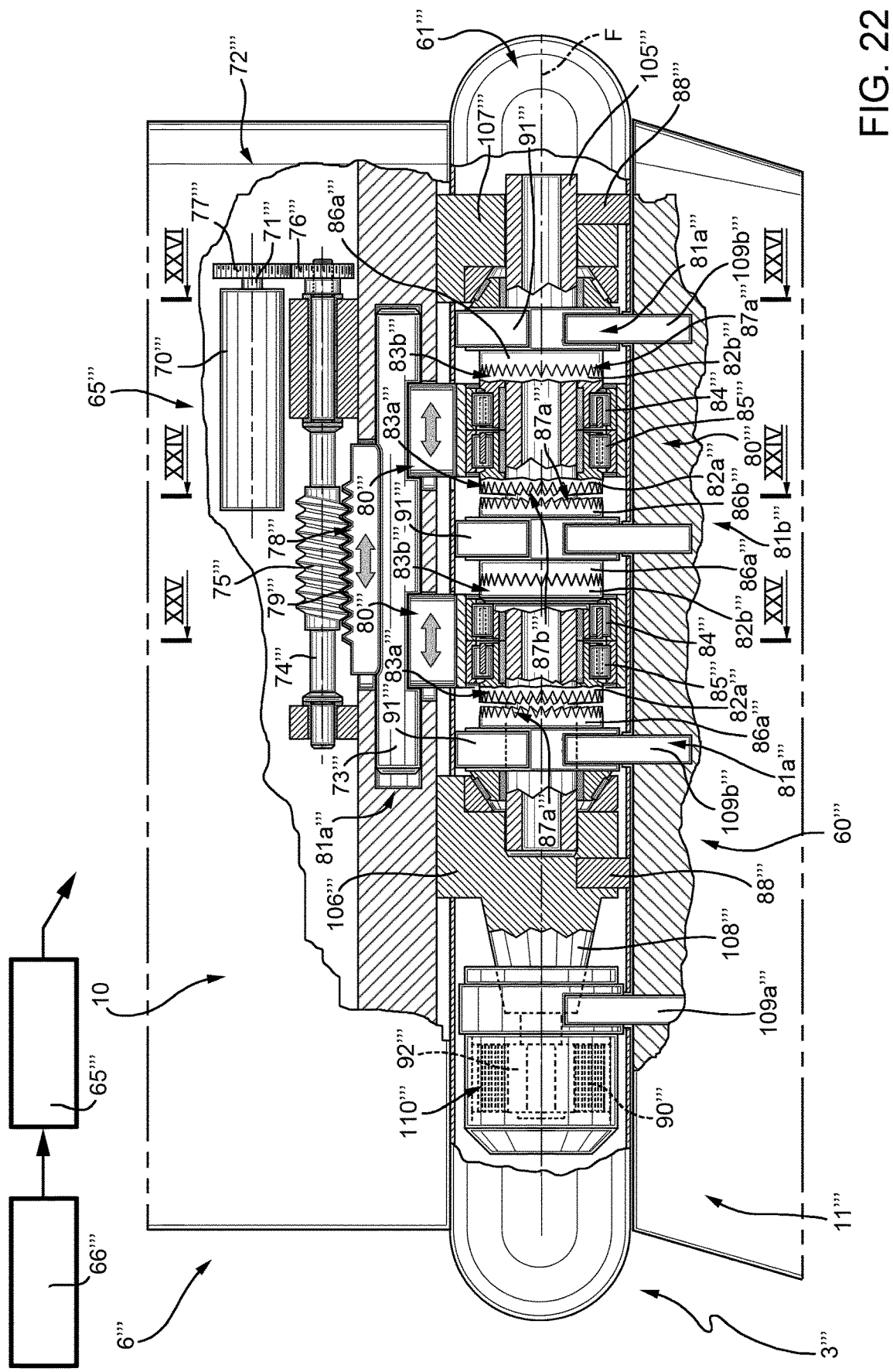
Figure 24:
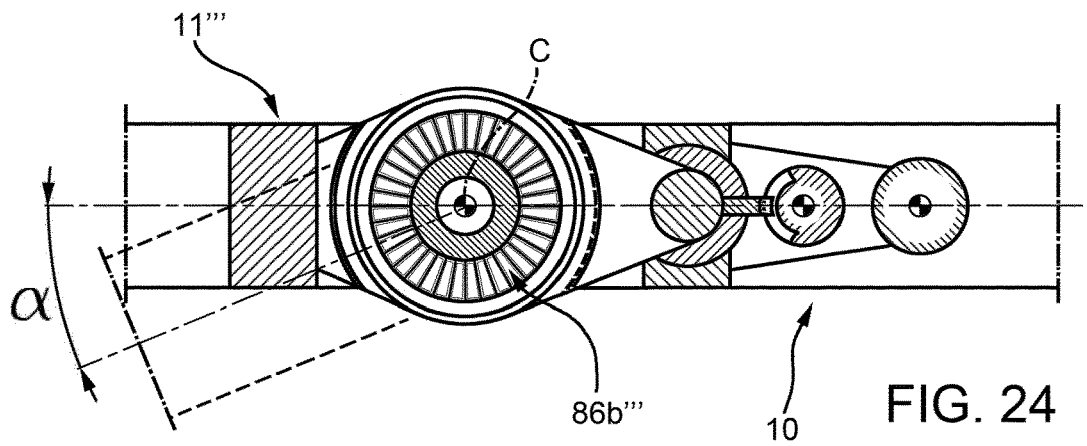
FIGS. 24 to 26 are sections taken along respective lines XXIV-XXIV and XXV-XXV and XXVI-XXVI of FIG. 22.
Figure 25:
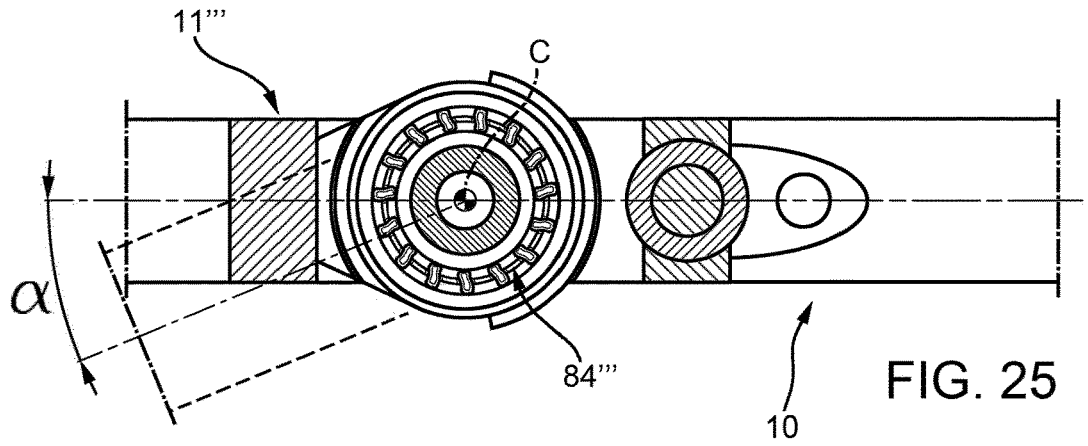
Figure 26:
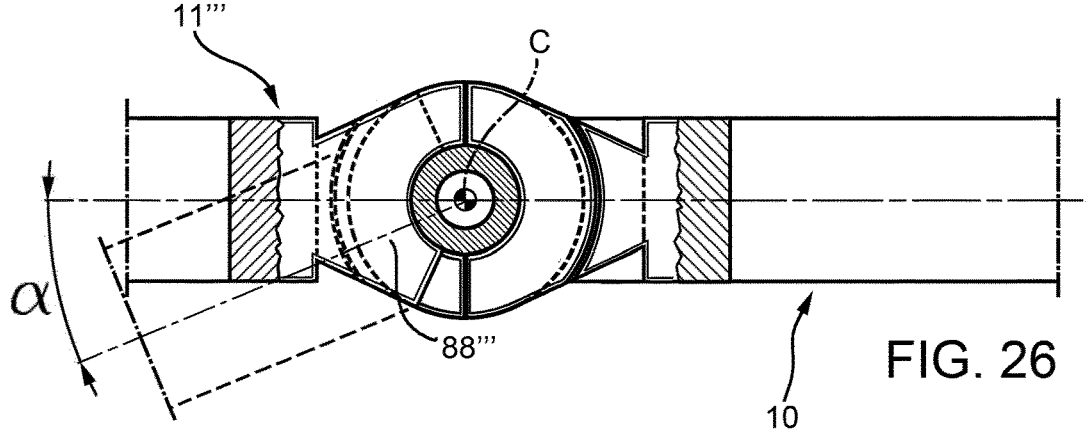

In particular, coupling elements 81a''' are arranged at axial ends of tip portions 11''' with respect to axis F. Coupling elements 81b''' (only one of which is shown in FIGS. 22 and 23a) are axially interposed between coupling elements 81a''' and are spaced along axis F Coupling element 80''' are also axially spaced along axis F.

In particular, each coupling element 80''' is axially interposed between one adjacent coupling element 81a''' and an adjacent coupling element 81b''', or between two adjacent coupling elements 81b''', or between one an adjacent coupling element 81b''' and other one adjacent coupling element 81a'''.

Actuator 65''' can be operated to alternatively engage coupling elements 80''' with first adjacent coupling elements 81a''', 81b''' in the first configuration of connecting means 60''', or to engage coupling elements 80''' with second adjacent coupling elements 81a''', 81b''' in the second configuration of connecting means 60'''.

Each coupling element 80''' comprises, in turn, a pair of axial end disks 82a''', 82b''' opposite to another and having respective toothed surfaces 83a''', 83b'''; and a pair of one-way freewheel clutches 84''', 85''' axially interposed between disks 82a''', 82b'''.

In greater detail, surfaces 83a''', 83b''' are arranged on respective opposite axial sides of one-way freewheel clutches 84''', 85'''.

Furthermore, one-way freewheel clutch 84''' allows the rotation of disk 82a''' only in the first angular direction and one-way freewheel clutch 85''' allows the rotation of disk 82b''' only in the second angular direction.

Each coupling element 81b''' comprises a pair of axial end disks 86a''', 86b''' opposite to another and having respective toothed surfaces 87a''', 87b'''.

Each coupling element 81a''' comprises only one axial end disk 86a''' having respective toothed surface 87a'''.

Surfaces 83a''', 83b''' of coupling element 80''' face surfaces 87a''', 87b''' of coupling elements 81a''', 81b''', which are axially adjacent thereto.

Actuator 65''' can be operated to displace coupling elements 80''' along axis F:

either up to a first axial position in which surfaces 83a''' of disk 82a''' mesh with respective surfaces 87a''', 87b''' of disk 86a''' of first adjacent coupling elements 81a''', 81b''' so as to determine the engagement of coupling element 80''' and first adjacent coupling element 81a''', 81b''';

or up to a second axial position in which surfaces 83a''' of disk 82a''' mesh with respective surface 87a'''. 87b''' of second adjacent coupling elements 81a''', 81b'''', so as to determine the engagement of coupling element 80''' and second adjacent coupling element 81a''', 81b'''.

In the first axial position, one-way freewheel clutches 84''' allow tip portion 11''' to rotate in the first angular direction relative to main portion 10 and prevent tip portion 11''' from rotating in the second direction relative to main portion 10.

In the second axial position, one-way freewheel clutches 85''' allow tip portion 11''' to rotate in the second angular direction relative to main portion 10 and prevent tip portion 11''' from rotating in the first direction relative to main portion 10.

In particular, teeth of toothed surface 83a''', 83b''' and teeth of toothed surfaces, 87a''', 87b''' are shaped in such a way that when toothed surfaces 83a''', 83b''' engage respective toothed surfaces, 87a''', 87b''', disks 82a''', 86a''' and 82h''', 86h''' can rotate integrally with one another about axis F, in both the first and the second angular directions.

The operation of rotor 3''' differs from that of rotor 3 in that the angular position of tip portion 11''' with respect to main portion 10 is determined by the resulting moment Mr on tip portion 11''' and by the position of connecting means 60'''.

The operation of rotor 3''' will be now described starting from a flight condition, in which helicopter 1 is in hovering and with reference to a single blade 6'''.

In this flight condition, aerodynamic moment Mlift is directed in the second direction when blade 6''' is advancing or retroceding.

Furthermore, control unit 66''' sets actuator 65''' in the first axial position. Accordingly, connecting means 60''' are set in the first configuration (shown in FIG. 22), in which they prevent the rotation of tip portion 11''' in the second angular direction with respect to main portion 10 and only allow the rotation of tip portion 11''' in the first angular direction with respect to main portion 10.

Accordingly, tip portion 11''' is kept in the first angular position in which it defines anhedral angle α with respect to main portion 10.

Furthermore, tip portion 11''' abuts against stop element 88''', which prevents any further rotation thereof in the first angular direction and any consequent undesired increase of anhedral angle α.

Being connecting means 60''' set in the first configuration, coupling elements 80''' engage coupling elements 81a'''. Still more precisely, surfaces 83b''' of disks 82b''' engage surfaces 87a''', 87b''' of disk 86a''', 86b''' of first adjacent connecting element 81a''', 81b'''. Furthermore, one-way freewheel clutch 84''' allows tip portion 11''' to rotate in the first angular direction relative to main portion 10 and prevents tip portion 11''' from rotating in the second angular direction.

In case it is necessary to operate helicopter 1 in forward flight, control unit 66''' sets actuator 65''' in the second axial position. As a consequence, connecting means 60''' are also set in the second configuration (FIG. 23a), in which they allow the rotation of tip portion 11''' with respect to main portion 10 in the second angular direction and prevent the rotation of tip portion 11''' in the first angular direction.

Thanks to the fact that connecting means 60''' are now set in the second configuration, tip portion 11''' increasingly rotates in the second angular direction only, up to when it reaches the second angular position in which the anhedral angle α is substantially null. In the second angular position, tip portion 11''' abuts against stop element 88''' which prevents any further rotation thereof in the second angular direction and any consequent undesired increase of the dihedral angle.

In particular, being connecting means 60''' set in the second configuration, control unit 66''' sets actuator 65''' in the second axial position (FIG. 23a).

Therefore, coupling elements 80''' engage second adjacent coupling elements 81a''', 81b'''. Still more precisely, surfaces 83a''' of disks 82a''' engage surfaces 87a''', 87b''' of disk 86a''', 86b''' of second adjacent coupling elements 81a''', 81b'''. Furthermore, one-way freewheel clutches 85''' allow tip portion 11''' to rotate in the second direction relative to main portion 10 and prevent tip portion 11''' from rotating in the first direction.

In case it is necessary to operate helicopter 1 in hovering, control unit 66''' sets back actuator 65''' in the first axial position. As a consequence, connecting means 60''' are also set in the first configuration (FIG. 23a), in which they allow the rotation of tip portion 11''' with respect to main portion 10 in the first angular direction only and prevent the rotation of tip portion 11''' in the second angular direction.

The increase in the forward speed of helicopter 1 causes at a speed greater than the threshold value:
- a positive lift acting on tip portion 10''' of blade 6''' both when it advances and retrocedes when the forward speed of helicopter 1 is still lower than the threshold value; and
- a positive lift acting on tip portion 10''' of blade 6''' when it retrocedes and a negative lift acting on tip portion 10''' of blade 6''' when it advances, when the forward speed of helicopter 1 is greater than the threshold value.

Accordingly, when the helicopter 1 still is in forward flight with a speed greater than the threshold value, tip portion 11''' rotates back in the first angular direction up to when it reaches the first position. This is due to the fact that, being negative the lift on tip portion 11''' of advancing blade 6''', resulting moment Mr on tip portion 11''' is directed in the first direction when blade 6''' is advancing.

At this point, helicopter 1 is set in hovering.

Figure 38:
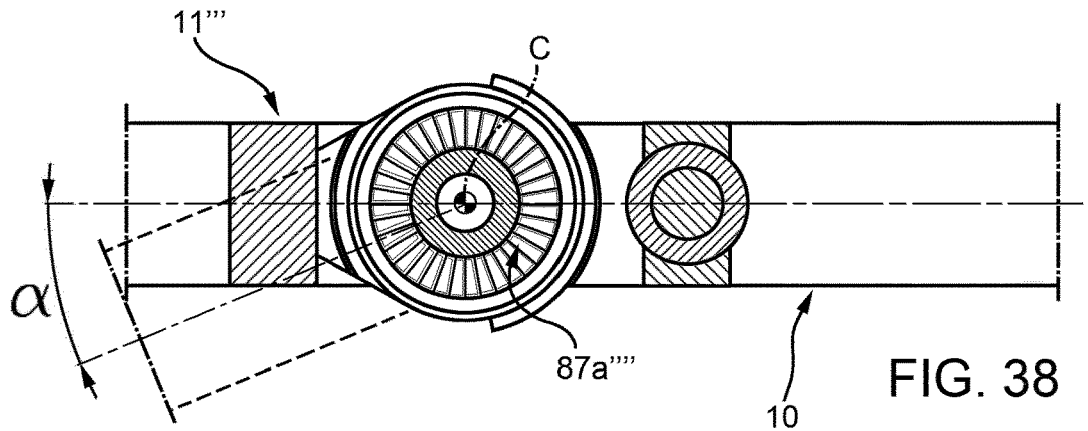
FIG. 38 is a section taken along lines XXXVIII-XXXVIII of FIG. 36.
Figure 30:
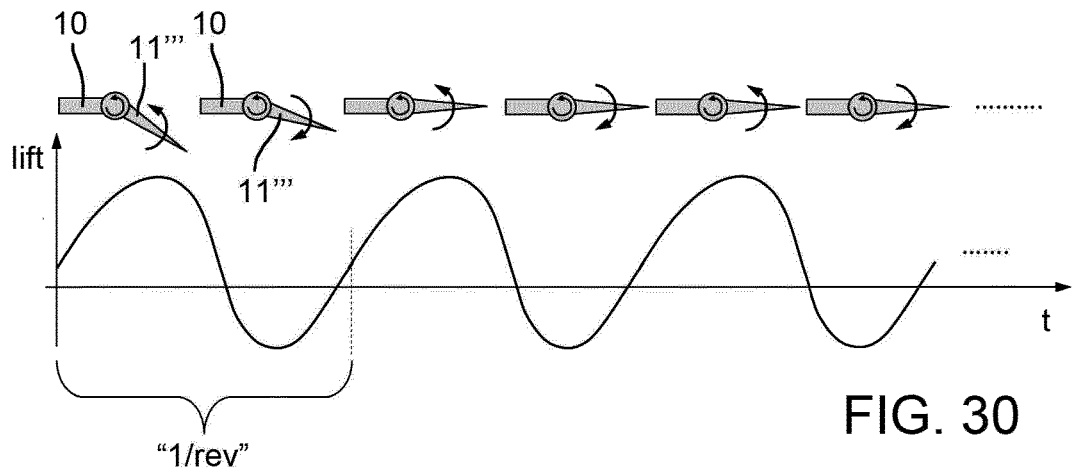
FIG. 30 shows the aerodynamic moment acting on the tip of the blade of FIGS. 21 to 23a during the transition from the first position to the second position in the condition of FIG. 27.
Figure 31:
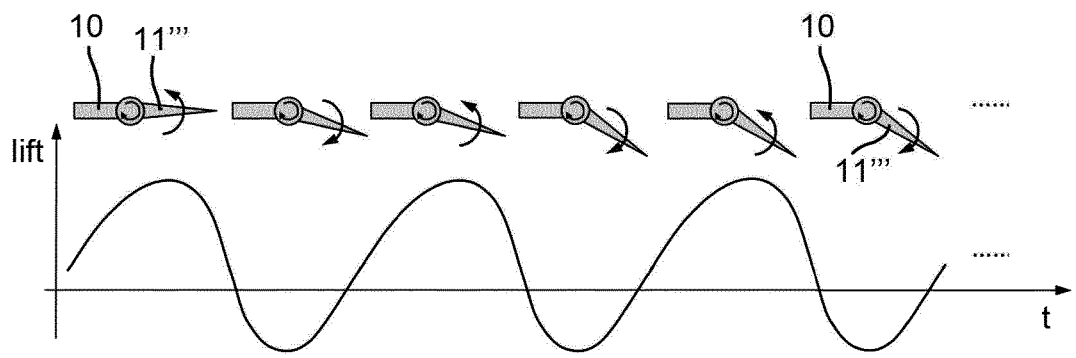
FIG. 31 shows the aerodynamic moment acting on the tip of the blade of FIGS. 21 to 23a during the transition from the second position to the first position in the condition of FIG. 27.
Figure 32:
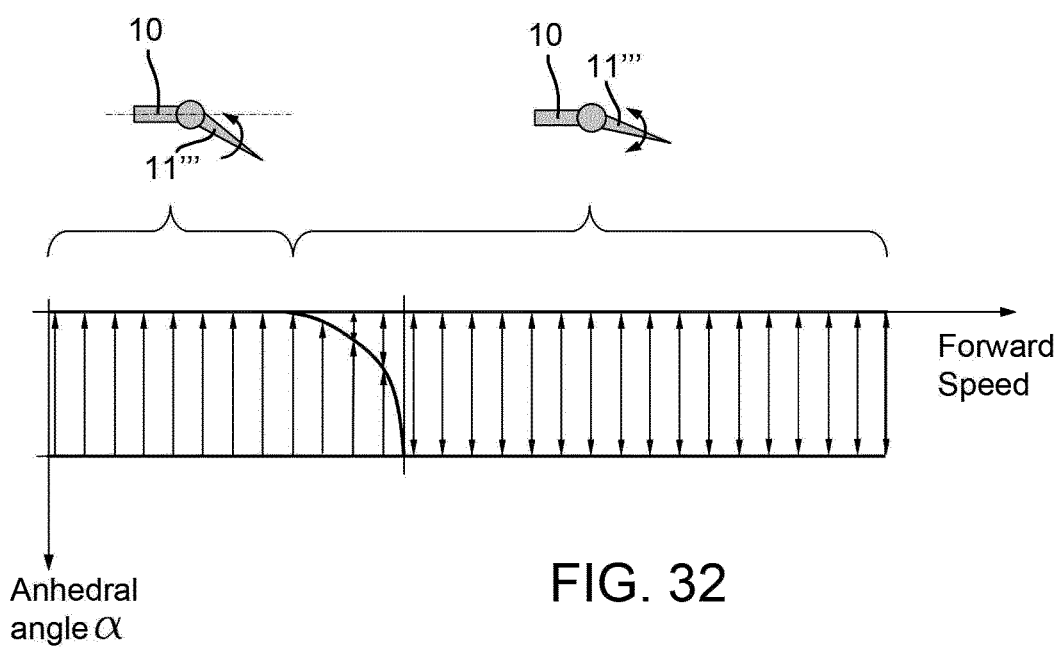
FIG. 32 shows the movement of the tip between the first and the second position as a function of the forward speed of the helicopter.
Figure 37:
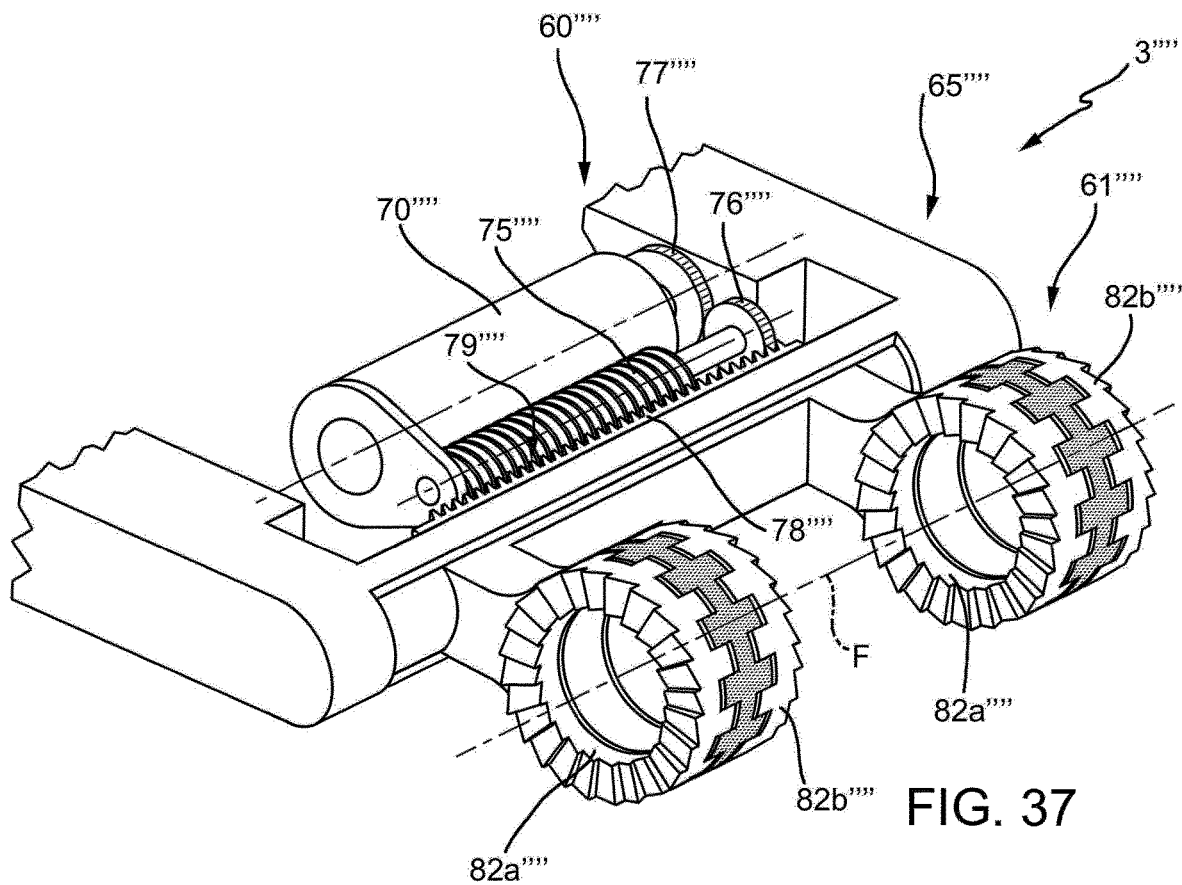
FIG. 37 is a perspective view of a tip portion of the blade of FIG. 36, with parts removed for clarity and in an enlarged view.
Figure 36:
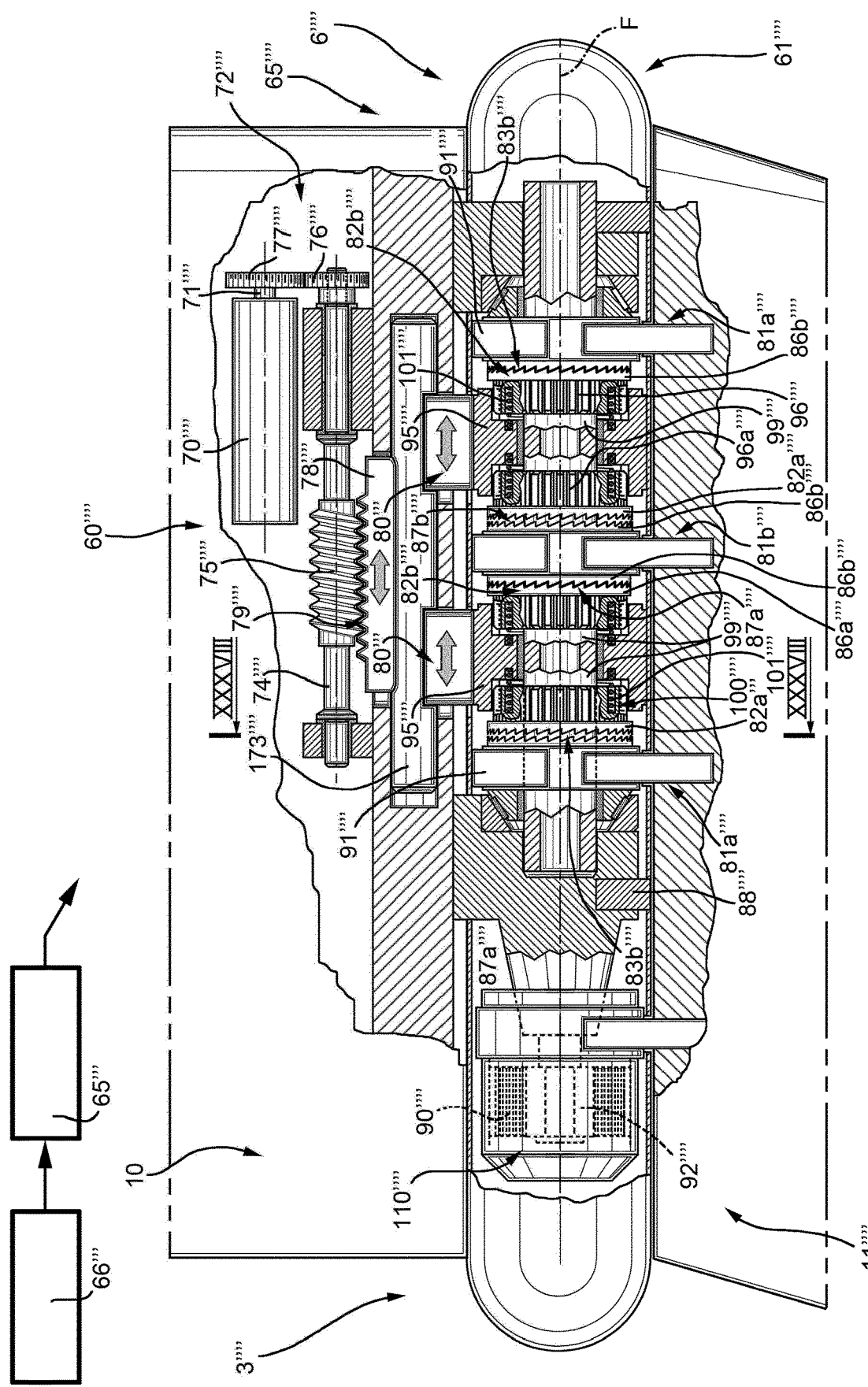
FIG. 36 is a partially sectioned view of a blade of a rotor according to a fifth embodiment of the present invention in a first position.

Referring to FIGS. 36 to 38, reference numeral 3'''' indicates, as a whole, a rotor according to a fourth embodiment of the present invention.

Rotor 3'''' differs from rotor 3''' in that each coupling element 80'''' comprises, in turn:
- an annular frame 95'''' connected to slide 78''' and movable parallel to axis F with slide 78'''';
- a pair of axial end disks 82a'''', 82b'''' (86a'''', 86b'''') opposite to another and having respective toothed surfaces 83a'''', 83b'''' (87a'''', 87b'''');
- a shaft 99'''' coaxial to axis F; and
- a pair of elements 96'''' arranged at respective axial ends of shaft 99'''' and fixed to respective disks 82a'''', 82b'''' (86a''', 86b''').

In greater detail, teeth of toothed surface 83a'''', 83b'''' and teeth of toothed surfaces 87a'''', 87b'''' are shaped in such a way that when toothed surfaces 83a'''', (83b'''') engage respective toothed surface 87a'''' (87b'''') of first (second) adjacent angular coupling element 81a'''', 81b'''', the rotation of disk 86a'''' (86b'''') in the first (second) angular direction causes the intermittent meshing of toothed surfaces 87a'''', 87b''''.

In particular, the intermittent meshing causes a back and forth movement of surfaces 83a'''' (83b'''') towards and away from surface 87a'''' (87b'''') parallel to axis F. Furthermore, teeth of toothed surface 83a'''', 83b'''' and teeth of toothed surfaces 87a'''', 87b'''' are shaped in such a way that when toothed surfaces 83a'''', (83b'''') engage respective toothed surface 87a'''' (87b''''), the rotation of disk 86a'''' (86b'''') in the second (first) angular direction is prevented.

In the embodiment shown, elements 96'''' are angularly movable integrally with shaft 99'''' about axis F and are axially slidable relative to shaft 99'''' along axis F.

In the embodiment shown, teeth of surfaces 83a'''', 83b'''' and 87a'''', 87b'''' are saw-teeth shaped.

In the embodiment shown, elements 96'''' are splined on the respective sides facing axis F while shaft 99'''' is splined on the opposite side with respect to axis F.

Furthermore, each coupling element 80'''' comprises, in turn, elastic means 100'''' interposed between frame 95'''' and elements 96''''. Elastic means 100'''' elastically load elements 96'''' and disks 82a'''', 82b'''' towards adjacent disks 86a'''', 86b'''' of adjacent coupling element 81a'''', 81b''''.

In detail, elastic means 100'''' comprises a plurality of springs 101'''', helical springs in the embodiment shown, interposed between frame 95'''' and elements 96''''.

Springs 101'''' extend along respective axes parallel to axis F and angularly spaced about axis F.

The operation of rotor 3'''' differs from that of rotor 3''' in that the, when connecting means 60'''' are set in the first configuration (FIG. 36), toothed surfaces 83a'''' of disks 82a'''' mesh with toothed surfaces 87a'''' of disks 86a'''' while toothed surfaces 83b'''' of disks 82b'''' are axially spaced from toothed surfaces 87b'''' of disks 86b''''.

Due to the shape of teeth of surfaces 83a'''', 87a'''', the meshing between disks 82a'''', 86a'''' allows the intermittent angular rotation of disks 86a'''' and, therefore, of tip portion 11'''' in the first angular direction with respect to disks 82a'''' and, therefore, to main portion 10.

This intermittent angular rotation is formed by a succession of alternate first time intervals in which teeth of surfaces 83a'''', 87a'''' mesh with one another and second time intervals in which teeth of surfaces 83a'''', 87a'''' are disengaged.

During the first time intervals, surfaces 83a'''' rotate in the first angular direction, thus rotating tip portions 11''''.

During the second time intervals, surfaces 83a'''' do not rotate, and the axial disengaging movement of surface 82a'''' causes the axial movement of elements 96'''' away from surfaces 83a'''' and the compression of springs 101''''. The subsequent extension of spring 101'''' causes the meshing of teeth of surfaces 83a'''', 87a'''' of respective disks 82a'''', 86a''''.

When the connecting means 60'''' are set in the second angular position, teeth of surfaces 83b'''', 87b'''' mesh with one another, thus preventing the rotation of disks 86b''' and, therefore, of tip portion 11 in the first angular direction and allowing the intermittent angular rotation of disks 86b''' and, therefore, of tip portion 11 in the second angular position.

From examination of the characteristics of the rotor 3, 3' 3", 3''' and 3'''' and the method according to the present invention, the advantages that can be achieved therewith are evident.

In particular, the tip portion 11 of each blade 6 is selectively movable between:
- the respective first position, in which the dihedral/anhedral angle α with respect to the main portion 10 is non-zero (FIGS. 4 to 6); and
- the respective second position, in which the sweep angle β with respect to the main portion 10 is non-zero (FIGS. 7 to 9).

In this way, unlike the known types of rotors described in the introductory part of this description, the rotor 3, 3', 3" and 3''' enable both:
- having high aerodynamic efficiency when the helicopter 1 is in hovering conditions and the blades 6 are arranged in the associated first positions; and
- having low noise when the helicopter 1 is in forward flight conditions and the blades 6 are arranged in the associated second positions.

This behaviour, optimized both in hovering conditions and in forward flight conditions, is obtained in a particularly simple manner and with substantially zero displacement of the barycentre of the blades 6 along axes C and D between the respective first and second positions.

In this way, the motor 20 does not need to counter high loads due to centrifugal force and only needs to generate relatively low actuating forces. In consequence, the motor 20 can be compact and low-cost.

Due to the fact that the transition of the tip portions 11 and 11" does not result in a substantial variation in the position of the barycentre of the associated blades 6 along axes C and D, the erroneous operation of one or more of the motors 20 and therefore the erroneous positioning of the respective tip portion 11 and 11" does not cause inertial unbalancing of the rotor 3, 3' and 3".

Due to the fact that the motor 20 is housed in the main portion 10 and that the sections 25 and 26 of the rods 21 are housed in the tip portions 11, the rotor 3, 3' and 3" does not alter the aerodynamic profile of the blades 6 and does not penalize the overall aerodynamic efficiency of the helicopter 1.

Finally, connecting means 60''', 60'''' can be selectively set in a first (second) configuration in which they allow the rotation of tip portion 11''' in the first (or in the second) angular direction and up to the first (second) angular position, and in which they prevent tip portion 11''', 11'''' from rotating in the second (or in the first) angular direction with respect to main portion 10.

In this way, it possible to move tip portions 11''', 11'''' between the first and second angular positions, by taking advantage of the fact that resulting Mr on tip portions 11''', 11'''':

is directed in the second angular direction when helicopter 1 is in hovering or in forward flight with a speed lower than threshold value; and is directed in the first angular direction when relative blades 6''' are advancing and helicopter 1 is in forward flight with a speed greater than the threshold value.

As matter of fact, when it is necessary to move tip portions 11''', 11'''' in the first angular position with the aim of increasing the anhedral angle of thereof, it is enough that actuator 65''' sets connecting means 60''', 60'''' in the first configuration and that the forward speed of the helicopter 1 is greater than the threshold value.

Conversely, when it necessary to move tip portions 11''', 11'''' in the second angular position with the aim of reducing anhedral angle α thereof, it is enough that actuator 65''' sets connecting means 60''', 60'''' in the second configuration for any hovering condition or forward speed of helicopter 1.

Accordingly, it is possible to adjust the anhedral angle of tip portions 11''', 11'''' with respect to main portion 10, by simply relying on aerodynamic forces and preferably on elastic moment Mk provided by spring 90''' and/or damping moment Md provided by damper 92'''.

It is therefore no longer necessary to provide a dedicated actuating system for adjusting the dihedral/anhedral angle of tip portions 11''', 11'''' with respect to main portion 10.

This is particularly advantageous because there is no need to transfer large power to rotating blades 6'''.

Furthermore, there is no need to provide the necessary volume for the actuating system at the interface between main portion 10 and tip portions 11''', 11''''. The latter can be therefore made in an optimized shape to meet the aerodynamic requirements.

Finally, it is also clear that modifications and variants can be made regarding the rotor 3, 3', 3", 3''' and 3'''' and method described and illustrated herein without departing from defined by the claims.

In particular, the rotor 3, 3' 3", 3''' and 3'''' could be used in a convertiplane instead of in the helicopter 1.

Furthermore, the tip portions 11 and 11" could have dihedral angles α in the respective first positions and negative sweep angles β in the respective second positions.

The transmission unit 22 could comprise an epicyclical train interposed between the motor 20 and the rods 21.

The actuator units 16 could be completely housed inside the tip portions 11 of the respective blades 6.

Rotor 3' might not comprise the transmission unit 22 and could comprise a plurality of motors 20 connected to associated rods 21 and not comprise the transmission unit 22.

Finally, as regard to rotor 3''', 3'''', the first and the second angular positions of tip portions 11''', 11'''' could correspond also to dihedral angles with respect to main portion 10 and could be achieved in flight conditions others than the ones indicated in the present description.

The invention claimed is:

1. A rotor (3''', 3'''') for a hover-capable aircraft (1), comprising:
    a hub (7) rotatable about a first axis (A); and
    at least two blades (6''') hinged to said hub (7);
    each of said at least two blades (6''') comprising a main portion (10) articulated to said hub (7) and a tip portion (11''', 11''''), which is arranged radially outermost from said first axis (A) with respect to the corresponding main portion (10);
    said tip portion (11''', 11'''') of each of said at least two blades (6''') being movable with respect to the corresponding said main portion (10) of said at least two blades (6''') between:
        a first angular position, in which said tip portion defines a first dihedral or anhedral angle (α) with respect to the corresponding said main portion (10); and
        a second angular position, in which said tip portion defines a second dihedral or anhedral or null angle different from the first dihedral or anhedral angle (α) with respect to the corresponding said main portion (10);
    said rotor (3''', 3'''') further comprising connecting means (60''', 60'''') for movably connecting said tip portion (11''', 11'''') to said main portion (10);
    characterized in that said connecting means (60''', 60'''') can be selectively set in a first configuration in which said connecting means (60''', 60''''):
    allow the rotation of said tip portion (11''', 11'''') with respect to said main portion (10) in a first angular direction and up to said first angular position of said tip portion (11''', 11'''') with respect to said main portion (10), by means of resultant moments (Mr) generated by inertia forces and aerodynamic forces on said tip portion (11''', 11''''); and
    prevent said tip portion (11''', 11'''') from rotating in a second angular direction, opposite to said first angular direction, with respect to said main portion (10).

2. The rotor of claim 1, wherein said connecting means (60''', 60'''') can be selectively set in a second configuration, in which said connecting means (60''', 60''''):
    allow the rotation of said tip portion (11''', 11'''') with respect to said main portion (10) in said second angular direction and up to said second angular position of said tip portion (10); and
    prevent said tip portion (11''', 11'''') from rotating with respect to said main portion (10) in said first angular direction.

3. The rotor of claim 2, further comprising:
a control unit (66'''); and
an actuator (65'''), which is controllable by said control unit (66''') and is actuatable to set said connecting means (60''', 60'''') in either said first configuration or said second configuration.

4. The rotor of claim 3, wherein said actuator (65''') is controllable to set said connecting means (60''', 60'''') in said first configuration, when said hover-capable aircraft (1) requires to be operated, in use, in hovering;
said actuator (65''') being controllable to set said connecting means (60''', 60'''') in said second configuration when said hover-capable aircraft (1) requires to be operated, in forward flight.

5. The rotor of claim 3, wherein said tip portion (11''', 11'''') defines the first anhedral angle (α) with respect to the corresponding said main portion (10) when set, in use, in said first angular position and/or said null angle with respect to the corresponding said main portion (10) when set, in use, in said second angular position.

6. The rotor of claim 5, wherein said actuator (65''') comprises an output member (73'''), which is slidable back and forth parallel to a second axis (F).

7. The rotor of claim 2, wherein said connecting means (60''', 60'''') comprise a hinge (61'''), which is configured to allow the rotation of said tip portion (11''', 11'''') with respect to said main portion (10) about a second axis (F).

8. The rotor of claim 7, wherein said connecting means (60''', 60'''') comprise:
at least one first coupling element (80''', 80'''') carried by one (11''', 11'''') of said tip portion (11''', 11'''') and said main portion (10); and
at least one second coupling element (81a''', 81b'''; 81a'''', 81b'''') carried by the other (11''', 11'''') of said tip portion (11''', 11'''') and said main portion (10);
said at least one first and at least one second coupling elements (80''', 80''''; 81a''', 81b'''; 81a'''', 81b'''') being selectively movable with respect to one another and parallel to said second axis (F) between a first axial position in which said at least one first and at least one second coupling elements (80''', 80''''; 81a''', 81b'''; 81a'''', 81b'''') are engaged with one another and a second axial position in which said at least one first and at least one second coupling elements (80''', 80''''; 81a''', 81b'''; 81a'''', 81b'''') are disengaged.

9. The rotor of claim 8, wherein said at least one first and at least one second coupling elements (80'''; 81a'''', 81b'''') comprise respective first and second disks (82a''', 82b'''; 86a''', 86b''''), which comprise respective plurality of first and second toothed surfaces (83a''', 83b'''; 87a''''; 87b'''') meshing with one another, when said at least one first and at least one second coupling elements (80''''; 81a'''', 81b'''') are set, in use, in said first axial position;
said plurality of first and second toothed surfaces (87a''', 87b''') being shaped in such a way to allow the rotation of said at least one first and at least one second coupling elements (80''', 80''''; 81a''', 81b'''; 81a'''', 81b'''') both in said first angular direction and in said second angular direction;
said at least one first coupling element (80''') comprising at least one one-way free-wheel clutch (84''', 85'''), which is interposed between said first disk (82a''', 82b'''; 86a''', 86b'''') and said relative one (10) of said tip portion (11''', 11'''') and said main portion (10).

10. The rotor of claim 8, wherein said at least one first and at least one second coupling elements (80''''; 81a'''', 81b'''') comprise respective first and second disks (82a'''', 82b''''; 86a'''', 86b''''), which comprise respective plurality of first and second toothed surfaces (83a'''', 83b''''; 87a''''; 87b'''') meshing with one another, when said at least one first and at least one second coupling elements (80''''; 81a'''', 81b'''') are set, in use, in said first axial position;
said plurality of first and second toothed surfaces (83a'''', 83b''''; 87a''''; 87b'''') being shaped in such a way to allow the intermittent rotation of said at least one first and at least one second coupling elements (80''''; 81a'''', 81b'''') in a respective one of said first angular direction and second angular direction and to prevent that rotation in respective another of said first direction and second direction.

11. The rotor of claim 10, wherein first and second teeth of said plurality of first and second toothed surfaces (87a'''', 87b'''') are saw-tooth shaped.

12. The rotor of claim 10, wherein said at least one first coupling element (80'''') comprises, in turn:
a first splined body (95'''') movable about said second axis (F); and
at least one second splined body (96''''), which is angularly and axially movable integrally together with said first disk (82a'''', 82b'''');
said at least one second splined body (96'''') being axially movable and angularly integral with respect to said first splined body (95'''').

13. The rotor of claim 12, further comprising:
a control unit (66'''); and
an actuator (65'''), which is controllable by said control unit (66''');
wherein said actuator (65''') comprises an output member (73'''), which is slidable back and forth parallel to the second axis (F), and the rotor further includes first elastic means (100'''', 101'''') interposed between said output member (73'''') and said at least one second splined body (96''''), and configured to elastically load said at least one second splined body (96'''') towards said first axial position.

14. The rotor of claim 13, further comprising second elastic means (90'''), which are interposed between said main portion (10) and said tip portion (11''', 11'''') and are configured to elastically load, in use, said tip portion (11''', 11'''') towards one of said first or second angular position.

15. The rotor of claim 8, further comprising:
an actuator (65''') with an output member (73'''');
wherein said at least one first coupling element (80'''') is carried by said main portion (10) and said at least one second coupling element (81a'''', 81b'''') is carried by said tip portion (11''', 11'''');
said at least one first coupling element (80'''') being movable together with said output member (73'''') parallel to said second axis (F).

16. The rotor of claim 1, further comprising damping means (91''') which are interposed between said main portion (10) and said tip portion (11''', 11'''') and are configured to exert, in use, a damping moment (Md) on said tip portion (11''', 11'''').

17. The rotor of claim 1, wherein said main portion (10) comprises at least one ballast (91''').

18. A method of controlling a rotor (3''', 3'''') for a hover-capable aircraft (1); said rotor (3''', 3''''), comprising:
a hub (7) rotatable about a first axis (A); and
at least two blades (6) hinged to said hub (7);
each of said at least two blades (6) comprising a main portion (10) hinged to said hub (7) and a tip portion (11''', 11''''), which is arranged radially outermost with respect to said first axis (A) with respect to the corresponding main portion (10);

said method comprising the steps of:
i) connecting said tip portion (11''', 11'''') in movable way with respect to said main portion (10);
ii) moving said tip portion (11''', 11'''') with respect to said main portion (10) between:
a first angular position, in which said tip portion defines a first dihedral or anhedral angle ($\alpha$) with respect to the corresponding said main portion (10); and
a second angular position, in which said tip portion defines a second dihedral or anhedral angle ($\alpha$) or a null angle, different from said first dihedral or anhedral angle ($\alpha$), with respect to the corresponding said main portion (10);
said method being characterized by comprising the steps of selectively:
iii) allowing the rotation of said tip portion (11''', 11'''') with respect to said main portion (10) in a first angular direction and up to said first angular position, by means of resultant moments (Mr) generated by inertia forces and aerodynamic forces on said tip portion (11''', 11''''); and
iv) preventing said tip portion (11''', 11'''') from rotating in a second angular direction, opposite to said first angular direction, with respect to said main portion (10).

19. The method of claim 18, further comprising the further steps of selectively:
v) allowing the rotation of said tip portion (11''', 11'''') with respect to said main portion (10) in said second angular direction and up to said second angular position of said tip portion (11''', 11''''); and
vi) preventing said tip portion (11''', 11'''') from rotating with respect to said main portion (10) in said first angular direction.

20. The method of claim 19, wherein said step v) is carried out when said hover-capable aircraft (1) is in forward flight with a speed greater than a threshold value and said hover-capable aircraft (1) needs to be operated in hover and/or when said hover-capable aircraft (1) is in hover; and/or said step vi) is carried out when said hover-capable aircraft (1) is in hover and said hover-capable aircraft (1) needs to be operated in forward flight.

21. The method of claim 19, further comprising the steps of:
vii) keeping said tip portion (10''', 10'''') in said first angular position, when said hover-capable aircraft (1) is in hover and said hover-capable aircraft (1) needs to be operated in said hover; and/or
viii) keeping said tip portion (10''', 10'''') in said second angular position, when said hover-capable aircraft (1) is in forward flight and said hover-capable aircraft (1) needs to be operated in said forward flight.

22. The method of claim 19, further comprising at least one of the steps ix) of generating an elastic moment (Mk) on said tip portion (10''', 10'''') and x) of generating a damping moment (Md) on said tip portion (10''', 10'''');
a lift acting on said tip portion (11''', 11'''') generating an aerodynamic moment (Mlift) being directed in said second angular direction when said hover-capable aircraft (1) is in hover or in forward flight with a speed lower than a threshold value; said aerodynamic moment (Mlift) being directed in said first angular direction when said hover-capable aircraft (1) is in forward flight with a speed greater than said threshold value and at least for one angular position of said at least two blades (6''', 6'''') with respect to said first axis (A);
wherein one resulting moment (Mr) of said resultant moments (Mr) on said tip portion (10''', 10'''') being directed in said second angular direction when said hover-capable aircraft (1) is in hover or in forward flight with a speed lower than said threshold value, and being directed in said first angular direction when said hover-capable aircraft (1) is in forward flight with a speed greater than said threshold value and at least for said one angular position of said at least two blades (6''', 6'''') with respect to said first axis (A).

23. A hover-capable aircraft, comprising:
a main rotor (3, 3', 3'') according to claim 1; and
a control unit (40) programmed to arrange said tip portions (11''', 11'''') of said at least two blades (6''') in the respective said first angular positions when said hover-capable aircraft (1) is in hovering conditions and in the respective said second angular positions when said hover-capable aircraft (1) is in forward flight conditions.

* * * * *